United States Patent
Sogo

(10) Patent No.: US 7,671,719 B2
(45) Date of Patent: Mar. 2, 2010

(54) ELECTRONIC STORAGE BOX, OPENING AND CLOSING METHOD OF ELECTRONIC STORAGE BOX, AND COMPUTER PROGRAM PRODUCT THEREOF

(75) Inventor: Norihito Sogo, Tokyo (JP)

(73) Assignee: Asian Integration Co., Ltd., Tokyo (JP)

( * ) Notice: Subject to any disclaimer, the term of this patent is extended or adjusted under 35 U.S.C. 154(b) by 1281 days.

(21) Appl. No.: 11/170,339

(22) Filed: Jun. 29, 2005

(65) Prior Publication Data

US 2007/0006328 A1    Jan. 4, 2007

(51) Int. Cl.
  B60R 25/00  (2006.01)
  G06K 19/00  (2006.01)
  E05C 3/06   (2006.01)
  E05C 19/00  (2006.01)
  B65D 55/14  (2006.01)
  E05B 49/00  (2006.01)

(52) U.S. Cl. .................. 340/5.73; 340/5.2; 292/201; 292/280; 70/63; 70/159; 70/278.1

(58) Field of Classification Search .......... 340/5.2, 340/5.73, 5.83; 70/63, 159, 162, 278.1; 292/95, 292/99, 102, 108, 201, 280, DIG. 11
See application file for complete search history.

(56) References Cited

U.S. PATENT DOCUMENTS

| | | | |
|---|---|---|---|
| 6,741,160 B1 * | 5/2004 | Dawson et al. | 340/5.55 |
| 6,882,269 B2 * | 4/2005 | Moreno | 340/5.73 |
| 2005/0077995 A1 * | 4/2005 | Paulsen et al. | 340/5.6 |
| 2005/0146419 A1 * | 7/2005 | Porter | 340/5.73 |
| 2005/0206499 A1 * | 9/2005 | Fisher | 340/5.73 |

FOREIGN PATENT DOCUMENTS

| | | |
|---|---|---|
| JP | 60-033987 A | 2/1985 |
| JP | 04-076887 U | 7/1992 |
| JP | 05-062677 U | 8/1993 |

(Continued)

OTHER PUBLICATIONS

Japanese Patent Office Action Dated Nov. 28, 2006 from the Corresponding Japanese Application No. 2004-075154, and English Translation.

*Primary Examiner*—Daniel Wu
*Assistant Examiner*—Mark Rushing
(74) *Attorney, Agent, or Firm*—Young Basile

(57) ABSTRACT

An electronic storage box, an electronic storage box opening and closing method, and computer program product, comprising: safety, portability, convenience, economical efficiency and presentation effects are provided. In case a cryptograph setting request signal is received from a PC 21, the electronic storage box 1 stores cryptograph information included in the cryptograph setting request signal. In case an opening and closing request signal is received from a PC 21, the electronic storage box 1 determines whether or not the cryptograph information included in the opening and closing request signal and the cryptograph information stored in a key storage portion 103 match with each other. In case it is determined that these pieces of the cryptograph information match with each other, the electronic storage box 1 allows a lid 12 to shift either to an opened state or a closed state according to the opening and closing state of the lid 12.

5 Claims, 13 Drawing Sheets

FOREIGN PATENT DOCUMENTS

| | | |
|---|---|---|
| JP | 05287944 | 11/1993 |
| JP | 06-056419 U | 8/1994 |
| JP | 07-029295 U | 6/1995 |
| JP | 07-178251 A | 7/1995 |
| JP | 07-300020 A | 11/1995 |
| JP | 08-218701 A | 8/1996 |
| JP | 11-332631 A | 12/1999 |
| JP | 2001-279969 A | 10/2001 |
| JP | 2002-314266 A | 10/2002 |
| JP | 2002342421 | 11/2002 |
| JP | 2003041822 | 2/2003 |
| JP | 2003-307077 A | 10/2003 |

\* cited by examiner

ELECTRONIC STORAGE BOX, OPENING AND CLOSING METHOD OF ELECTRONIC STORAGE BOX, AND COMPUTER PROGRAM PRODUCT THEREOF

BACKGROUND OF THE INVENTION

1. Field of the Invention

The present invention relates to an electronic storage box whose lid is opened and closed by input of cryptograph information, an opening and closing method of the electronic storage box, and the computer program product thereof.

2. Description of the Related Art

Heretofore, a storage box capable of locking a lid so as not to be opened by using a key has been used. As such storage box, for example, a piggy bank, a safe, and a suitcase can be cited. Such storage box is high in safety since a lid is not opened unless a key is used, and has been used widely.

Meantime, techniques of unlocking and locking without using a physical key have been disclosed, for example, in JP5-287944A (abstract), JP2002-342421A (abstract) and JP2003-41822A (abstract).

JP5-287944A discloses a technique which releases the locking of a box attached to electronic equipment by inputting a secrete code to electronic equipment such as a word processor. Further, JP2002-342421A discloses a technique which releases the locking of a private mail box by inputting information indicating an electronic key from a communication interface attached to the private mail box. Further, JP2003-41822A discloses a technique, which transmits a release signal from a mobile phone and releases the locking of appliances.

By utilizing the techniques disclosed in the patent documents, without using a physical key, but using cryptograph information such as a password and the like, the locking of the lid of the storage box can be electrically released.

Incidentally, in case a storage box with a key is given more security, portability, convenience, beauty of external appearance, and some dramatic presentation effects on occasions when the lid is opened, there is a possibility of the storage box being used for a wider variety of applications in addition to the application used for storing one's possessions in security. By developing such storage box, it is possible to cultivate a new market.

For example, such storage box has a possibility of being used as a box to be delivered from a giver to a recipient by putting a gift inside the box. In this case, when the lid of the storage box is constituted in such a manner as to be opened and closed through insertion of a physical key into the hole of a lock, though there is every possibility and danger of the recipient losing the key or the lid being opened through thievery of both the storage box and key by strangers, if the lock of the lid is electrically released by using the techniques disclosed in the patent documents, it is possible to enhance security.

Further, when the lock of the lid of the storage box is released, if the lid is not manually opened, but is controlled to slowly open in an opening direction, then it is convenient, and dramatic presentation effects can be enhanced. However, in case the structure for opening and closing the lid is made complicated, the cost thereof becomes expensive, and this makes it necessary to realize the box by a simple structure.

An object of the present invention is to provide an electronic storage box, an opening and closing method of the electronic storage box, and the computer program product thereof, which can solve the problems.

SUMMARY OF THE INVENTION

To solve the problems, in the electronic storage box comprising: a main body having a storage portion inside and an opening portion; and a lid controlled in shifting to a state in which the opening portion is covered in a closed state, and moreover, the opening portion is not covered by a lock mechanism, and being in a state in which the opening portion is not covered in an opened state, and moreover, released from a control by the lock mechanism, the invention according to claim 1 is characterized by further comprising: cryptograph storage means for storing cryptograph information included in a cryptograph setting request signal in case the cryptograph setting request signal is received from an external device; determining means for determining whether or not cryptograph information included in an opening and closing request signal and the cryptograph information stored in the cryptograph storage means match with each other in case the opening and closing request signal is received from an external device; and opening and closing means for shifting the lid either to an opened state or a closed state according to the opening and closing state of the lid in case it is determined that these pieces of the cryptograph information match with each other by determining means.

According to the invention according to claim 1, in case it is determined that these pieces of the cryptograph information match with each other, the electronic storage box shifts the lid either to an opened state or a closed state according to the opening and closing state of the lid, and therefore, after confirming that these pieces of the cryptograph information match with each other, the storage box can control the opening and closing of the lid of the electronic storage box. Hence, safety, convenience and presentation effects of the electronic storage box can be enhanced. Further, since the driving direction of the lid is controlled according to the opening and closing state of the lid at the determining time, the mechanism and structure of driving the electronic storage box can be prevented from becoming complicated, thereby becoming economically efficient.

The invention according to claim 2 in the electronic storage box according to claim 1 is characterized in that the opening and closing means releases a control by the lock mechanism in case the lid is in the closed state, and moreover, by driving the lid after releasing the control, the opening and closing means shifts the lid to an opened state, and in case the lid is in an opened state, the opening and closing means drives the lid to the direction to cover the opening portion, and moreover, after the driving the lid, the opening and closing means performs a control by the lock mechanism so as to shift the lid to a closed state.

According to the invention according to claim 2, since the opening and closing means controls a control by the lock mechanism and the driving direction of the lid depending on whether the current state of the lid is in an opened state or a closed state, the mechanism and structure of driving the lid of the electronic storage box can be prevented from becoming complicated. Further, since the opening and closing means can control the shift between an opened state and a closed state of the lid, the user is not required to manually open and close the lid, and this is convenient for the user, and can enhance the presentation effects.

The invention according to claim 3 in the electronic storage box according to claim 1 or 2 is characterized that the external device is any one of a personal computer, a mobile communication terminal, and game equipment.

According to the invention according to claim 3, since the external device is any one of a personal computer, a mobile communication terminal, and game equipment, the user inputs the cryptograph information to the personal computer and the mobile communication terminal, so that the cryptograph setting request signal and the opening and closing request signal can be transmitted to the electronic storage box from the personal computer and the mobile communication terminal. In this manner, by using the personal computer and the mobile communication terminal, the user can set the cryptograph information to the electronic storage box and open and close the lid of the electronic storage box. Further, in case the external device is the game equipment, since the opening and closing request signal can be transmitted to the electronic storage box from the game equipment, for example, the electronic storage box can be opened and closed according to the state of the game being executed by the game equipment.

The invention according to claim 4 in the electronic storage box according to any one of claims 1 to 3 is characterized by being operated by the power supplied through a cable connected with the external device.

According to the invention according to claim 4, since the power for operating the electronic storage box is supplied through a cable connected with the external device, a plug for power supply and a dry battery mounting portion for fitting a battery are not required for the electronic storage box itself, and this can make the structure simple. It is convenient for the user also because connecting operations and attaching operations can be omitted. Further, since there is no need to supply the power from the battery, the operation of the electronic storage box can be prevented from being stopped due to battery shutoff.

The invention according to claim 5 in the electronic storage box according to any one of claims 1 to 4 is characterized in that the opening and closing means includes: a gear for transmitting the torque of a motor, while reducing a rotational speed of the motor; a slide shaft for transmitting the torque of the gear, while converting it into a reciprocal motion power; an angle change shaft for changing the angle of the reciprocal motion power transmitted by the slide shaft; a link mechanism having one end connected to the angle change shaft and changing the reciprocal motion power changed in angle by the angle change shaft into a rotational movement; and a clutch connected to the other end of the link mechanism and transmitting the rotational motion power converted by the link mechanism to a rotating shaft of the lid.

According to the invention according to claim 5, the opening and closing means allows the rotational speed of the motor to be reduced by the gear so as to transmit the torque to the rotating shaft of the lid through the slide shaft, the angle change shaft, the link mechanism, an elastic body, and the clutch, and this can allow the lid to slowly open and close.

The invention according to claim 6 in the electronic storage box according to claim 5 is characterized in that the clutch includes a first clutch portion connected to the other end of the link mechanism and a second clutch portion rotated in association with the rotating shaft, and the first clutch portion and the second clutch portion comprise a plurality of V-shaped teeth and are provided with mutually interlocked engaging portions, and the opening and closing means that includes the elastic body is coupled to the second clutch portion, and moreover, for energizing the engaging portions provided in the first clutch portion and the second clutch portion so as to be put into a mutually engaged state, and in case a motive power is applied to the second clutch portion through the rotating shaft from the lid, the V-shaped inclination is adjusted so that the mutually engaged state of the engaging portions is released.

According to the invention according to claim 6, in case a motive power is applied to the second clutch portion through the rotating shaft from the lid, since the V-shaped inclination is adjusted so that the mutually engaged state of the engaging portions is released, when a force is applied on the lid, the lid can be rotated without transmitting the motive power to the first clutch portion and the link mechanism. Hence, the clutch and the link mechanism can be prevented from being applied with a great shock and thus broken.

The invention according to claim 7, in an electronic storage box opening and closing method for shifting the closing and opening state of the lid with respect to the electronic storage box comprising: a main body having a storage portion inside and an opening portion; and a lid controlled in shifting to a state in which the opening portion is covered in a closed state, and moreover, the opening portion is not covered by a lock mechanism, and being in a state in which the opening portion is not covered in an opened state, and moreover, released from a control by the lock mechanism, is characterized by further comprising: a cryptograph storage step for storing cryptograph information included in the cryptograph setting request signal in case a cryptograph setting request signal is received from an external device; determining steps for determining whether or not the cryptograph information included in the opening and closing request signal and the cryptograph information stored in the cryptograph storage step match with each other in case the opening and closing request signal is received from the external device; opening and closing state determining step for determining the opening and closing state of the lid in case it is determined that these pieces of the cryptograph information match with each other in the determining step; and an opening and closing state shifting step for shifting the lid to a closed state in case it is determined that the lid is in an opened state in the opening and closing state determining step and shifting the lid to an opened state in case it is determined that the lid is in a closed state in the opening and closing state determining step.

According to the electronic storage box opening and closing method according to claim 7, since the electronic storage box controls the opening and closing state of the lid only when the pieces of the cryptograph information match with each other, the opening and closing state of the lid can be controlled, while keeping security. Hence, the user utilizing the electronic storage box can benefit from safety and convenience, and at the same time, can enjoy automatic closing and opening of the lid.

The invention according to claim 8 provides a computer program product allowing a computer to function as cryptograph information storage means for storing the cryptograph information for driving the lid provided in the external device in the direction to open, game proceeding status management means for managing the proceeding status information indicating the proceeding status of the game outputted by the execution of the game, proceeding status determining means for determining whether or not the proceeding status information managed by the game proceeding status management means indicates the predetermined status specified in advance, and cryptograph information output means for outputting the cryptograph information stored in the cryptograph storage means to the external device so as to drive the lid of the external device in the direction to open in case it is determined that the proceeding status information indicates the predetermined status specified in advance.

According to the invention according to claim 8, in order for the computer program product to allow the computer to function as the cryptograph storage means, the game proceeding status management means, the proceeding status determining means, and the cryptograph information output means, the computer, in case the proceeding status of the game is in a predetermined status specified in advance, outputs the cryptograph information to the external device such as the electronic storage box and the like, thereby shifting the lid of the external device to an opened state. In this manner, the user can take out a thing such as a premium and the like stored inside the external device according to the proceeding status of the game.

According to the present invention, in case it is determined that the pieces of the cryptograph information match with each other, since the electronic storage box allows the lid to shift either to an opened state or closed state, the opening and closing state of the lid of the electronic storage box can be safely controlled, which is convenient for the user, and at the same time, the dramatic presentation effects of the box can be enhanced. Further, since the driving direction of the lid is controlled according to the opening and closing state of the lid at the determining time, the mechanism and structure of driving the lid of the electronic storage box can be prevented from becoming complicated, thereby becoming economically efficient.

DETAILED DESCRIPTION OF THE PREFERRED EMBODIMENTS

Figure 1:
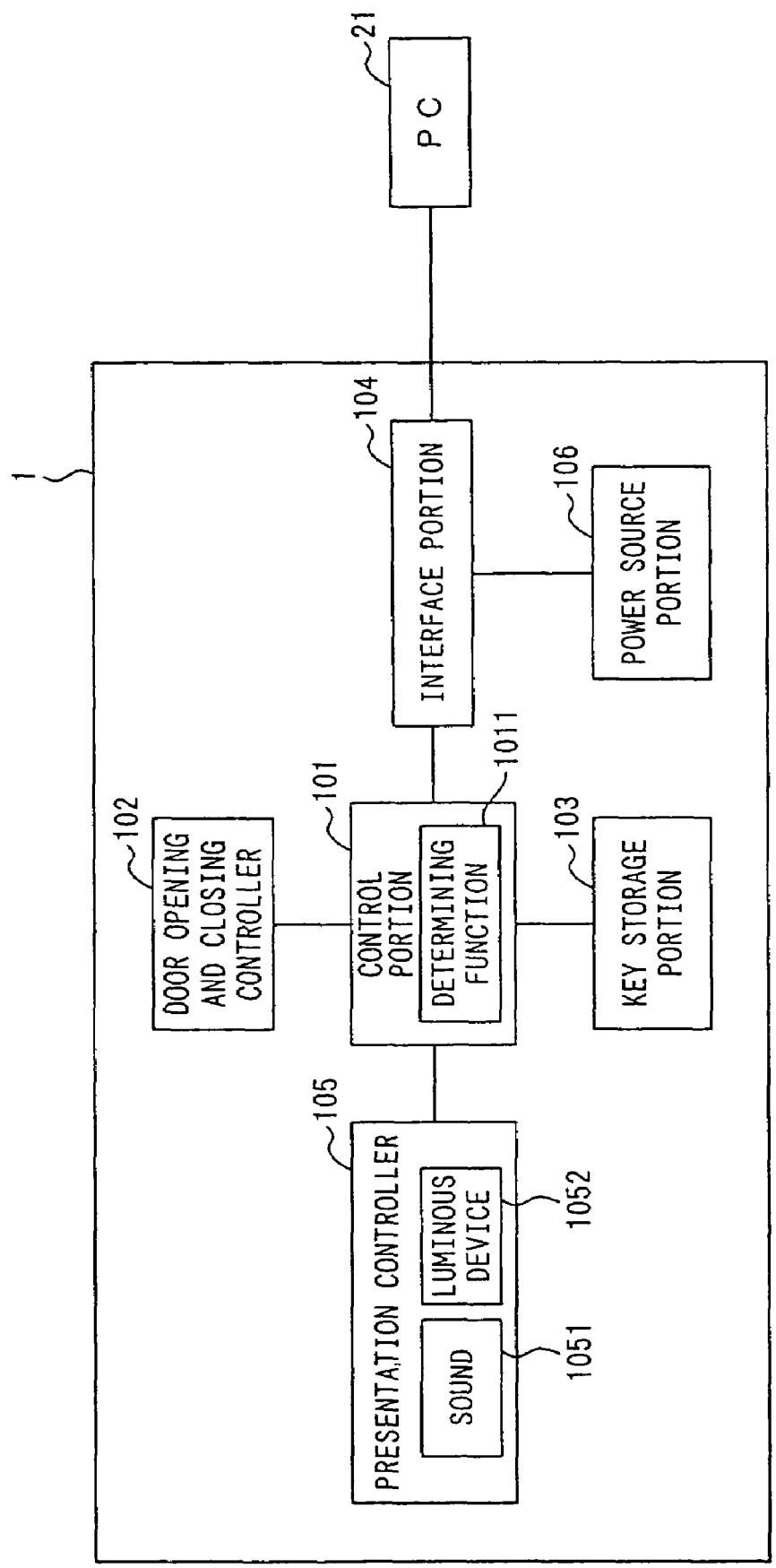
FIG. 1 is a block diagram showing the constitution of a storage box opening and closing system according to a first embodiment of the present invention.

Next, the best mode for carrying out the present invention will be described with reference to the drawings. It should be noted that, in each figure referred to in the following description, the same reference numerals would be attached to component parts equivalent with other figures.

First Embodiment

<A-1. Constitution>
<A-1-1. Overall Constitution>
FIG. 1 is a block diagram showing an overall constitution of a storage box opening and closing system according to the first embodiment of the present invention. As shown in the figure, the storage box opening and closing system is constituted by an electronic storage box 1 and a personal computer (hereinafter referred to as <PC>) 21. The electronic storage box 1 is a storage box which opens and closes a lid by an electrical signal. The PC 21 is a device for supplying an electrical signal for giving instructions to the electronic storage box 1 and a power.

Figure 2:
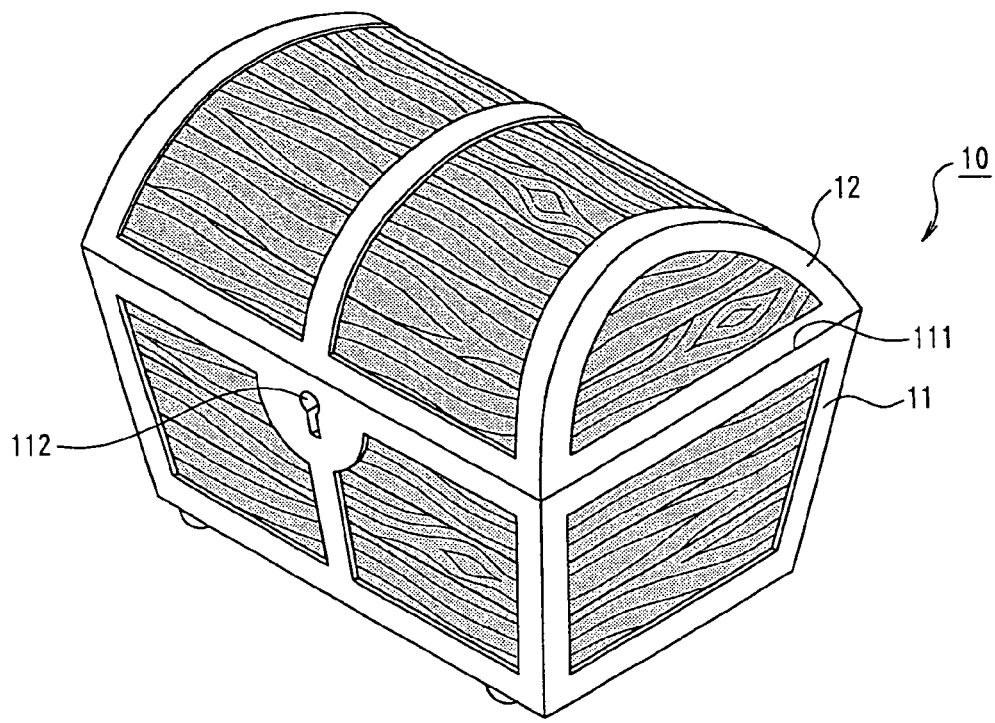
FIG. 2 is a view showing an oblique view seeing an electronic storage box according to the first embodiment from a front surface direction.

<A-1-2. Electronic Storage Box>
FIG. 2 is an oblique view of the electronic storage box 1 according to the present invention seen from the front direction. As shown in the figure, the electronic storage box 1 comprises a main body 11, a lid 12 covering an opening portion 111 provided on the upper portion of the main body 11. On the front upper portion of the main body 11, there is provided a key hole 112. Inside the main body 11 in the vicinity of the key hole 112, there is provided a lock mechanism to be described in detail later for controlling the shifting from a closed state in which the lid 12 covers the main body 11.

Here, the closed state is referred to as a state in which the lid 12 covers the opening portion 111 of the main body 11, and moreover, the lid 12 is controlled not to shift from a state covering the main body 11 by the lock mechanism. Meantime, the opened state is referred to as a state in which the lid 12 does not cover the opening portion 111 of the main body 11, and moreover, is not controlled in the movement of the lid 12 by the lock mechanism.

Figure 3:
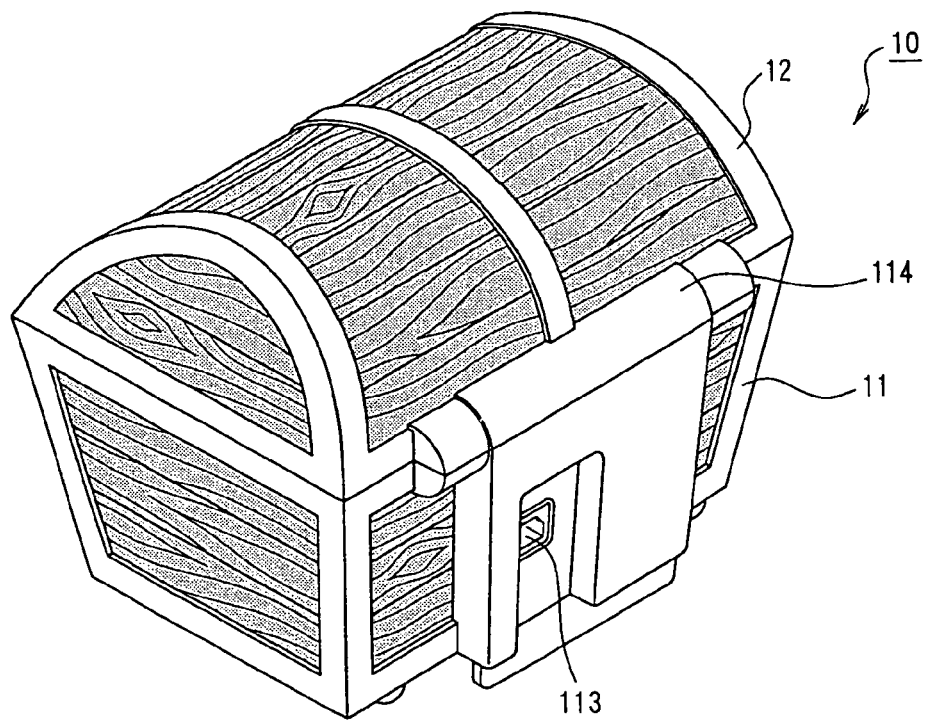
FIG. 3 is a view showing an oblique view seeing an electronic storage box according to the first embodiment from a rear surface direction.

In FIG. 3 is shown an oblique view of the electronic storage box 1 seen from the rear direction. As shown in the figure, on the rear surface of the main body 11, there is provided an USB connecting terminal 113 for plugging an USB (Universal Serial Bus) cable. The electronic storage box 1 receives the power supply from the PC 21 through the USB cable plugged into the USB connecting terminal 113, and at the same time, receives electrical signals indicating various types of instructions.

Further, in the portion where the main body 11 and the lid 12 are connected, there is provided a hinge portion 114. The cylindrical shaped region of the hinge portion 114 becomes a shaft on occasions when the lid 12 is rotated. Further, the hinge portion 114 serves also as a part to fixing the main body 11 and the lid 12. In the inside of the hinge portion 114, there is disposed a gear for rotating the lid 12, which will be described later. Further, in the inside of the hinge portion 114, there is disposed a wiring for supplying the power supplied from the USB connecting terminal 113 to a motor.

Figure 4:
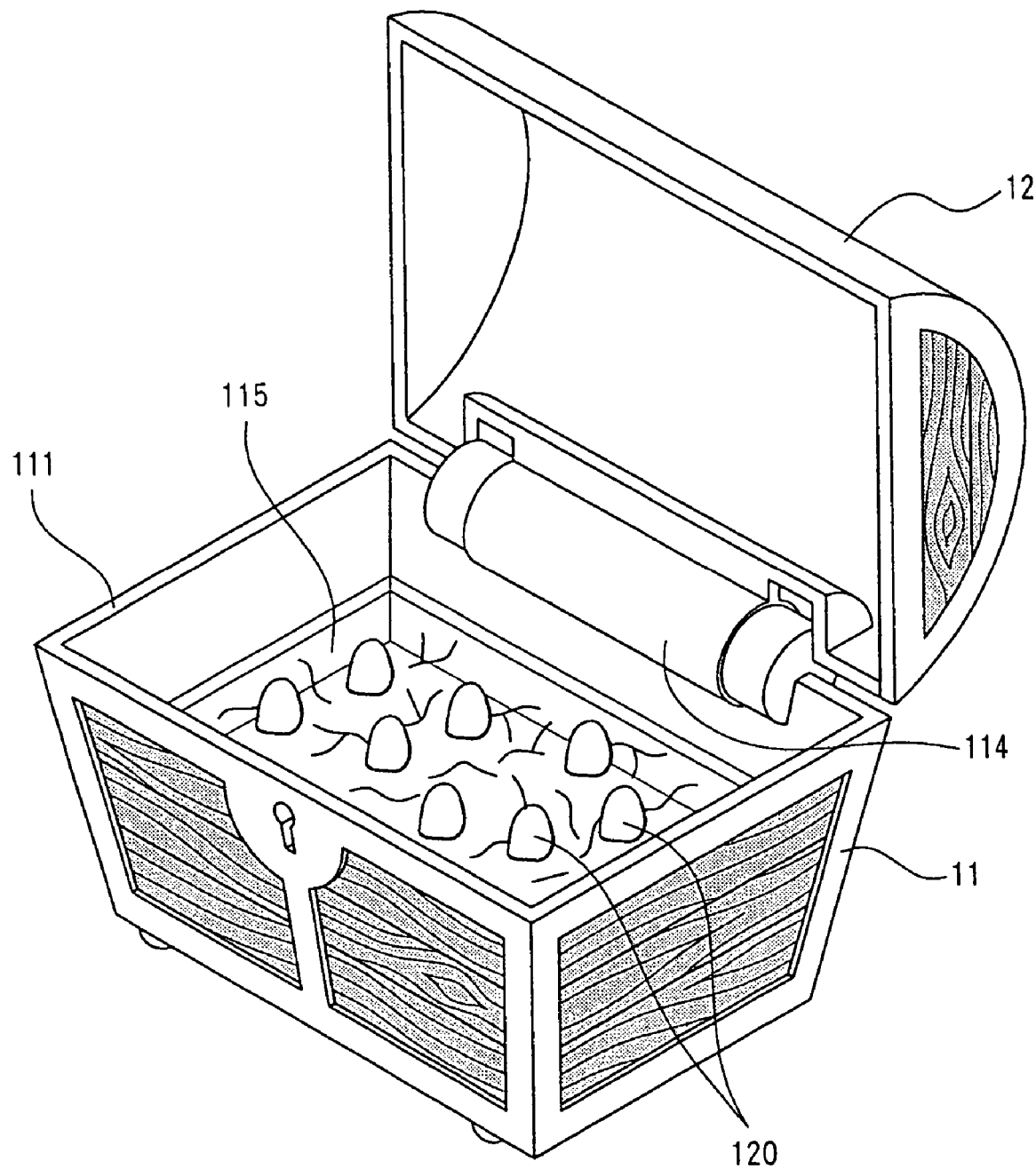
FIG. 4 is a view showing an oblique view of the electronic storage box in an opened state according to the first embodiment.

In FIG. 4 is shown an oblique view of the electronic storage box 1 in a state in which the lid 12 is opened. As shown in the figure, in the inside of the main body 11, there is provided a storage portion 115 which is a space for storing things. Further, on the bottom of the main body 11, there are disposed a plurality of LED (Light Emitting Diode) 120.

Figure 5:
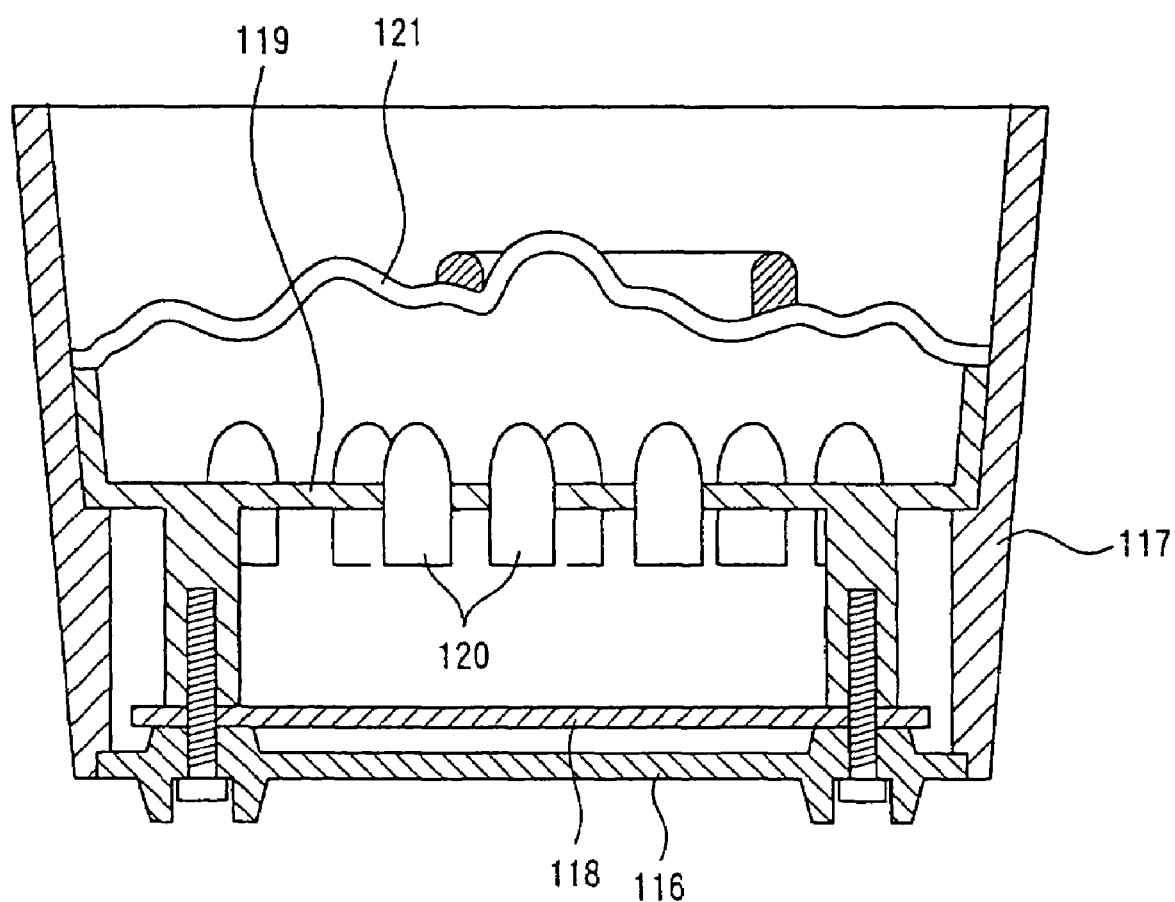
FIG. 5 is a cross section view of the electronic storage box according to the first embodiment.

In FIG. 5 is shown a cross-sectional view of the main body 11. As shown in the figure, the main body 11 is constituted by a bottom plate 116 and a frame body 117. On the bottom plate 116, there are disposed a motor and a gear (not shown). In the upper portion of the gear, there is disposed a substrate 118. In the substrate 118, there are arranged integrated circuits (IC). By the integrated circuits, a CPU (Central Processing Unit), a ROM (Read Only Memory), a RAM (Random Access Memory), a non-volatile memory such as a EPROM (Erasable Programmable Read Only Memory), a flush memory and the like are formed.

The non-volatile memory stores various data and programs. For example, the non-volatile memory is provided with a cryptograph storage area for storing the cryptograph information received by the USB connecting terminal 113. Here, the cryptograph information is information used for performing visa certification on the occasions when the lid 12 of the electronic storage box 1 is opened and closed. The cryptograph information includes, for example, a password constituted by a plurality of alphabetic characters, and information in which the inputted information on full names and the like is encrypted by a common crypto system.

Further, the non-volatile memory is provided with an area for storing the opening and closing status management information for managing whether or not the lid 12 of the current electronic storage box 1 is in an opened state or in a closed state. This area is written with the opening and closing status management information indicating an opened state in case a sensor provided in the electronic storage box 1 detects an opened state, and is written with the opening and closing status management information indicating a closed state in case a closed state is detected.

Further, the non-volatile memory stores a program for storing the cryptograph information received from the PC 21 in the cryptograph storage area, and a program for shifting the lid 12 from the current opening and closing state in case the cryptograph information received from the PC 21 and the cryptograph information stored in the cryptograph storing area are compared, and these pieces of the cryptograph information match with each other.

In the upper side of the substrate 118, there is provided a LED fixed/reflecting cover 119. The LED fixed/reflecting cover 119 is embedded with a plurality of LED 120. The surface of this LED fixed/reflecting cover 119 is applied with silver plating, and moreover, an uneven pattern is formed, which presents, for example, an external appearance as if an aluminum foil were lightly clenched.

In the upper side of the LED fixed/reflecting cover 119, there is provided a detachably attachable LED upper side cover 121. The LED upper side cover 121 is formed by transparent acryl.

Figure 6:
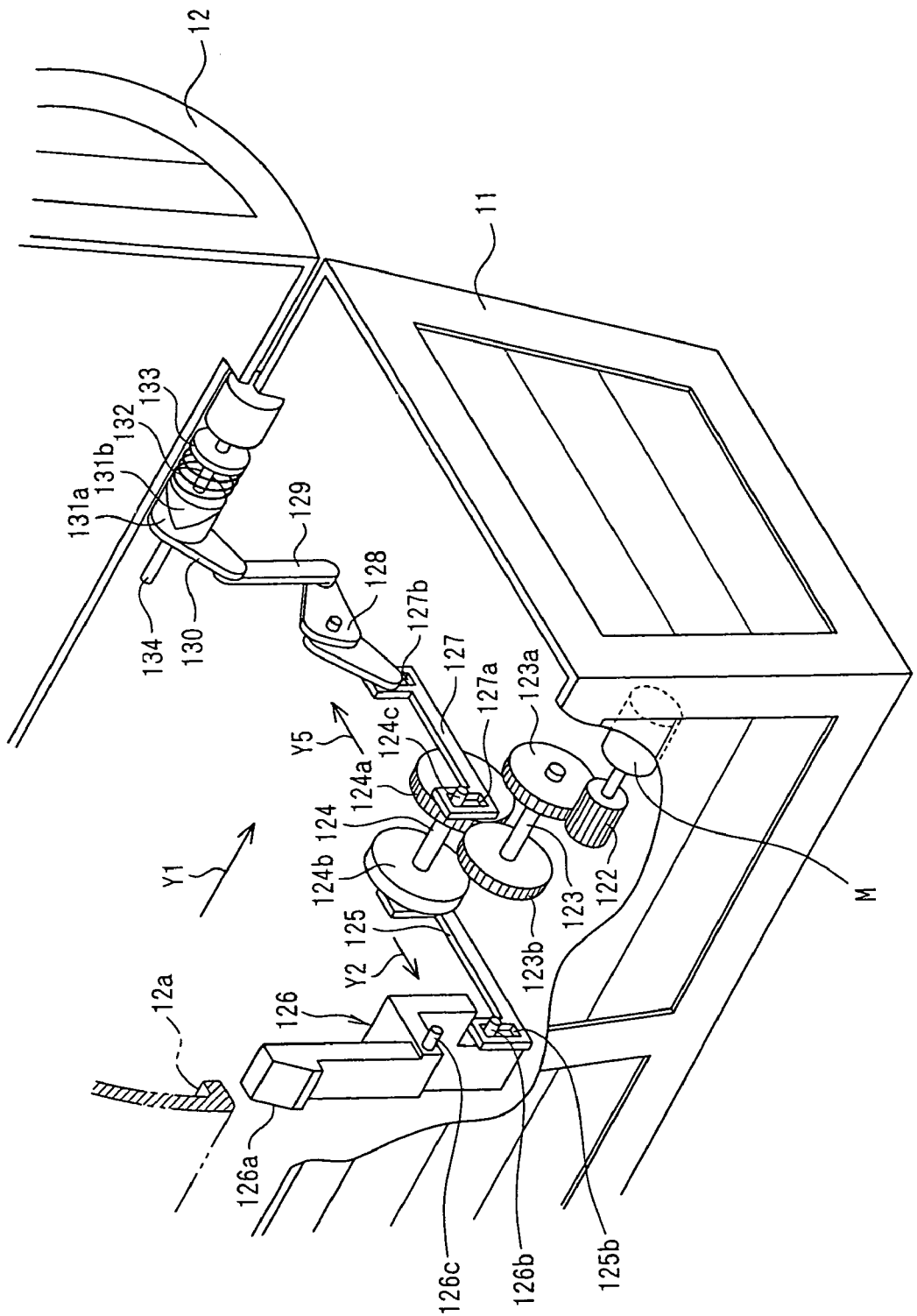
FIG. 6 is a view for explaining an opening and closing mechanism and a lock mechanism of the lid according to the first embodiment.

In FIG. 6 is shown parts constituting the lock mechanism and the opening and closing mechanism of the lid 12 disposed inside of the main body 11.

The lock mechanism is constituted by including a lid lock piece 12a, a lid lock 126, a slide shaft 125, a rotating shaft 124, a gear shaft 123, and a motor unit M. A rotating shaft of the motor unit M is coupled to a cylindrical gear 122. Hence, the gear 122 is reciprocally rotated and driven according to the polarity of the driving voltage supplied to the motor unit M from a power source portion 106.

Both ends of a gear shaft 123 are provided with disc gears 123a and 123b. One gear 123a of the gear shaft 123 engages with a gear 122, and the other gear 123b of the gear shaft 123 engages with a disc gear 124a provided on one end of the rotating shaft 124.

Figure 7:
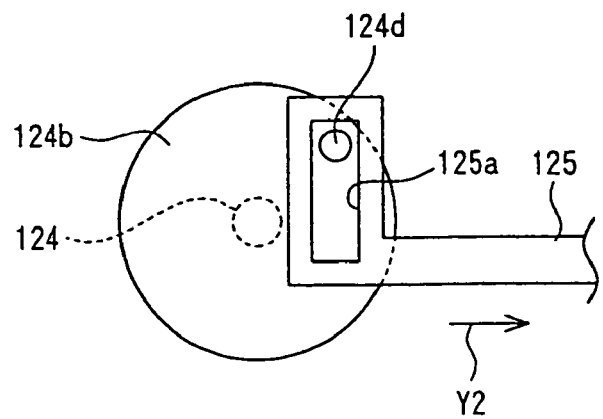
FIG. 7 is a view of a slide shaft 125 and a disc 124*b* according to the first embodiment seen from the direction of an arrow mark Y1 of FIG. 6.

The other end of the rotating shaft 124 is provided with a disc 124b. This disc 124b is rotated accompanied with a reciprocal rotation of the rotating shaft 124. At a position close to the periphery of one side of the gear 124a, that is, at a position eccentric to the rotating center of the rotating shaft 124, there is provided a protruding portion 124c. Further, as shown in FIG. 7 seen from the direction of an arrow mark Y1 of FIG. 6, the disc 124b is not provided with a gear, and at a position close to the periphery of one side of the disc 124b, that is, at a position eccentric to the rotating center of the rotating shaft 124, there is provided a protruding portion 124d.

The slide shaft 125 is a flat plate disposed approximately in parallel with the side plate of the main body 11. Both ends of this slide shaft 125 are provided with hole portions 125a and 125b. The hole portion 125a of one end of the slid shaft 125 has the protruding portion 124d on the disc 124b of the rotating shaft 124 inserted thereinto.

The lid lock 126 is disposed in the vicinity of the key hole 112 of the main body 11. The lid lock 126 is constituted by including an upper claw portion 126a, a lower protruding portion 126b, and a rotating shaft 126c of the center portion. The protruding portion 126b of the lid lock 126 is inserted into the hole portion 125b of one end of the slide shaft 125. The lid lock piece 12a is provided on one side edge of the lid 12. The lid lock piece 12a is engaged with the claw portion 126a of the lid lock 126 in a closed state. This state is a state in which the movement of the lid 12 is controlled by the lock mechanism.

In the constitution thus described, when the power is supplied to the motor unit M from the power source portion 106, the motor unit M is driven and the gear 122 is rotated. In association with this rotation of the gear 122, the gear shaft 123 is rotated, and in association with this rotation of the gear shaft 123, the rotating shaft 124 is rotated. In this manner, the protruding portion 124d provided on the disc 124b of the rotating shaft 124 is rotated, and in association with this, the slide shaft 125 slides in the direction of an arrow mark Y2 of FIG. 7 or in its reverse direction.

Figure 8A:
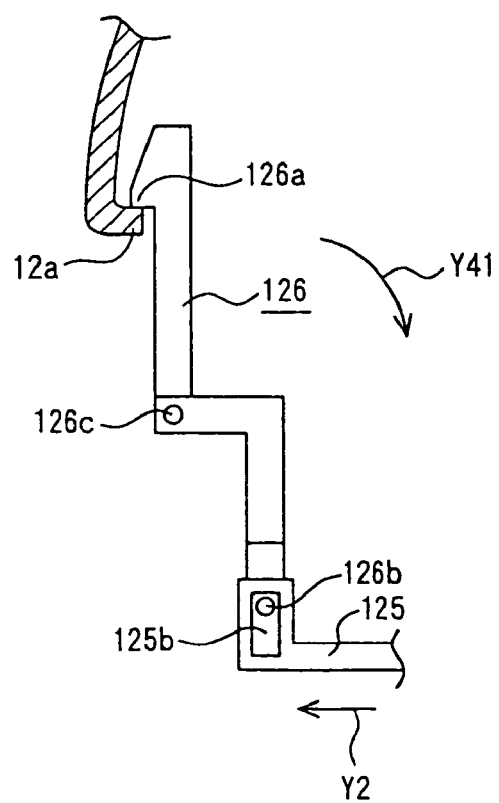
FIGS. 8A and 8B are views of a lid lock piece 12*a* and a claw portion 126*a* of a lid lock 126 according to the first embodiment seen from the direction of an arrow mark Y1 of FIG. 6 and in its reverse direction.

As shown in FIG. 8A, in a state in which the lid lock piece 12a and the claw portion 126a of the lid lock 126 are engaged (a state in which the movement of the lid 12 is controlled by the lock mechanism), in case the slide shaft 125 slides in the front direction (in the direction of the arrow mark Y2 of FIG. 7 and in the direction of the arrow mark Y2 in the FIG. 8A) of the main body 11, the protruding portion 126b inserted into the hole portion 125b moves in the same direction. Hence, the lid lock 126 rotates in the direction of an arrow mark Y41 in FIG. 8A with the rotating shaft 126c as a center, and the claw portion 126a moves in a direction to separate from the front of the main body 11. Hence, the engagement between the lid lock piece 12a and the claw portion 126a of the lid lock 126 is released. That is, a control by the lock mechanism is released.

Figure 8B:
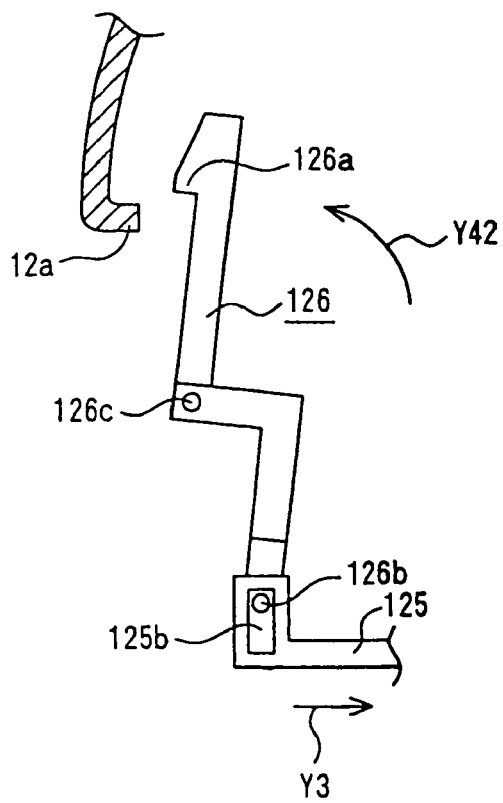

Meantime, to perform a control by the lock mechanism from the state in which a control by the lock mechanism is released, the polarity of the driving voltage supplied from the power source portion 106 is reversed, whereby the motor unit M may be rotated in a direction reverse to the time when a control by the lock mechanism is released. In this manner, the slide shaft 125 slides to the direction of an arrow mark Y3 in FIG. 8B, and the protruding portion 126b inserted into the hole portion 125b moves to the same direction. Hence, the lid lock 126 rotates in the direction of an arrow mark Y42 in the figure with the rotating shaft 126c as a center, and the claw portion 126a moves in the direction to approach the front of the main body 11. By this movement, an engaging state between the lid lock piece 12a and the claw portion 126a is formed. That is, a state is formed in which a control by the lock mechanism is performed.

Next, an opening and closing mechanism will be described. The opening and closing mechanism is constituted by including the motor unit M, the gear 122, the gear shaft 123, the gear 124a, a slide shaft 127, an angle change shaft 128, an arm 129, a rotating portion 130, clutch portions 131a and 131b, a spring 132, and a rotating disc 133.

The slide shaft 127 is disposed approximately in parallel with the side plate of the main body 11, and slides in the direction of an arrow mark Y5 shown in FIG. 6 or in its reverse direction. Both end of the slide shaft 127 are provided with hole portions 127a and 127b. The protruding portion 124c on the gear 124a of the rotating shaft 124 is inserted into the hole portion 127a of one end of the slide shaft 127.

Figure 9:
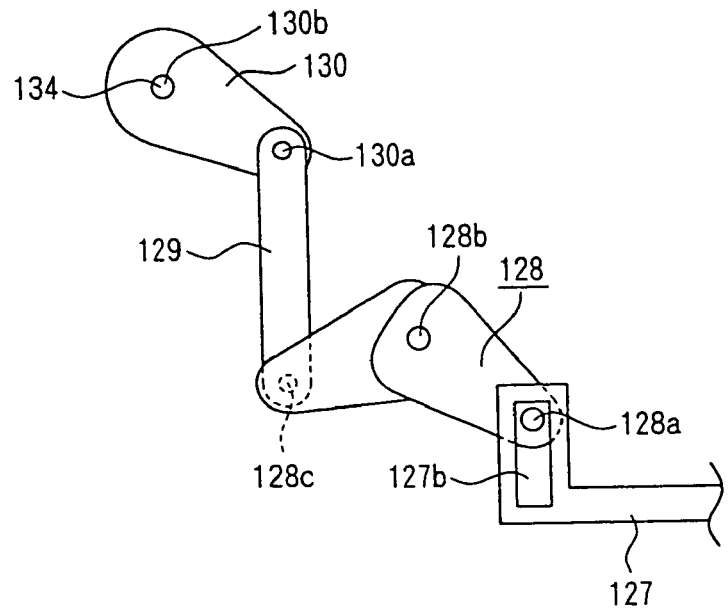
FIG. 9 is a view of the vicinity of an arm 129 according to the first embodiment seen from the direction of an arrow mark Y1 of FIG. 6.

Further, as shown in FIG. 9, the hole portion 127b of the other end of the slide shaft 127 is inserted with a protruding portion 128a which is provided on one end of the angle change shaft 128. The angle change shaft 128 is rotated with the rotating shaft 128b as a center. A protruding portion 128c provided on the other end of the angle change shaft 128 is coupled to the hole portion of one end of the arm 129. The hole portion of the other end of the arm 129 is coupled to a protruding portion 130a provided on one end of the rotating portion 130. A hole 130b provided on the rotating portion 130 has a rotating shaft 134 of the lid 12 inserted thereinto.

Figure 10:
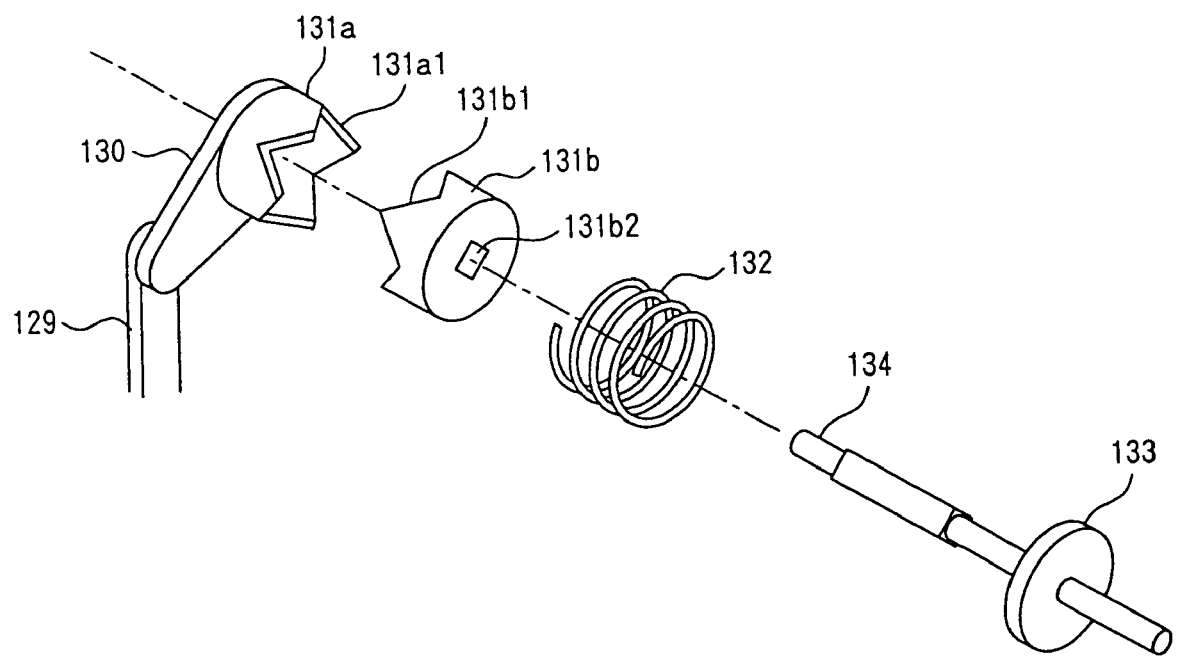
FIG. 10 is a view showing an exploded view of the parts provided inside a cylindrical cover of a hinge portion 114 according to the first embodiment.

In FIG. 10 is shown an exploded view of parts provided inside the cylindrical cover of the hinge portion 114. As shown in the figure, the rotating portion 130 is connected and fixed with one end of the clutch portion 131a. The other end of the clutch portion 131a has an engaging portion 131a1 formed therein. The engaging portion 131a1 is provided with a plurality of V-shaped gears having gentle inclination. The degree of this inclination is adjusted such that the function of a clutch to be described later can be realized.

One end of the clutch portion 131b working as a clutch by engaging with the engaging portion 131a1 of this clutch portion 131a has also an engaging portion 131b1 provided with a plurality of teeth similarly to the engaging portion 131a1 formed therein. The other end of the clutch portion 131b is connected with one end of the spring 132 having contraction and expansion properties and being spirally wound. The other end of the spring 132 is connected with the rotating disc 133. The rotating disc 133 is fixed to the rotating shaft 134 of the lid 12. This rotating shaft 134 has one end fixed to the rotating disc 133, and the other end penetrates through the spring 132, the hole portion 131b2 of the clutch portion 131b, the clutch portion 131a, and the hole portion 130b of the rotating portion 130 in that order.

Here, the clutch portion 131b is formed in such a manner as to be able to slide in the shaft direction of the rotating shaft 134, and moreover, by associating with the rotation of the rotating shaft 134, is formed in such a manner as to integrally rotate with the rotating shaft 134.

To integrally rotate with the rotating shaft 134, the clutch portion 131b is, for example, constituted as shown in FIG. 10. That is, the shape of the hole portion 131b2 provided in the clutch portion 131b and the cross-sectional shape of the rotating shaft 134 of the portion penetrating the hole portion 131b2 are constituted such that both shapes are made rectangular, and are integrally rotated almost in a tightly engaged state.

It should be noted that the constitution in which the clutch portion 131b integrally rotates with the rotating shaft 134 is not limited to this. For example, a recessed area may be provided on the one hand of the hole portion 131b2 and the rotating shaft 134 and a protruded portion may be provided on the other hand, so that both of the recessed area and the protruded portion are mutually engaged, thereby allowing the rotating shaft 134 and the clutch portion 131b to integrally rotate.

By such a constitution, the torque given to the rotating portion 130 is transferred to the engaging portion 131b1 of the clutch portion 131b through the engaging portion 131a1 of the clutch portion 131a, and the torque transferred to the clutch portion 131b is transferred to the rotating shaft 134 by the hole portion 131b2.

In the constitution as described above, when the power is supplied to the motor unit M from the power source portion 106, the motor unit M is driven and rotated. In association with the rotation of this motor unit M, the gear shaft 123 is rotated, and in association with this rotation, the rotating shaft 124 is rotated, and moreover, the protruding portion 124c provided on the disc 124b of the rotating shaft 124 is rotated. When this rotational motion is transferred to the slide shaft 127, it is converted into a reciprocal motion, and the slide shaft 127 slides in the direction of the arrow mark Y5 or in its reverse direction. When the reciprocal motion of the slide shaft 127 is transferred to the angle change shaft 128, the angle change shaft 128 changes an angle of the transferred reciprocal motion. In association with the movement of the angle change shaft 128, the arm 129 performs the reciprocal motion. The reciprocal motion of the arm 129 is converted into a rotational motion in the rotating portion 130. The torque of the rotating portion 130 is transferred to the clutch portions 131a and 131b, and the rotating shaft 134. Hence, the rotating shaft 134 rotates, and in association with this rotation of the rotating shaft 134, the lid 12 is opened and closed. The opening and closing direction of the lid 12 depends on the polarity of the driving voltage supplied from the power source portion 106.

Here, though the motor unit M is driven at the rotational speed of 8000 rpm, eventually, the rotating shaft 134 rotating the lid 12 is adjusted to rotate at a low speed of 0.2 rpm. Hence, the lid 12 is shifted to an opened state or a closed state at a leisurely speed.

Figure 11A:
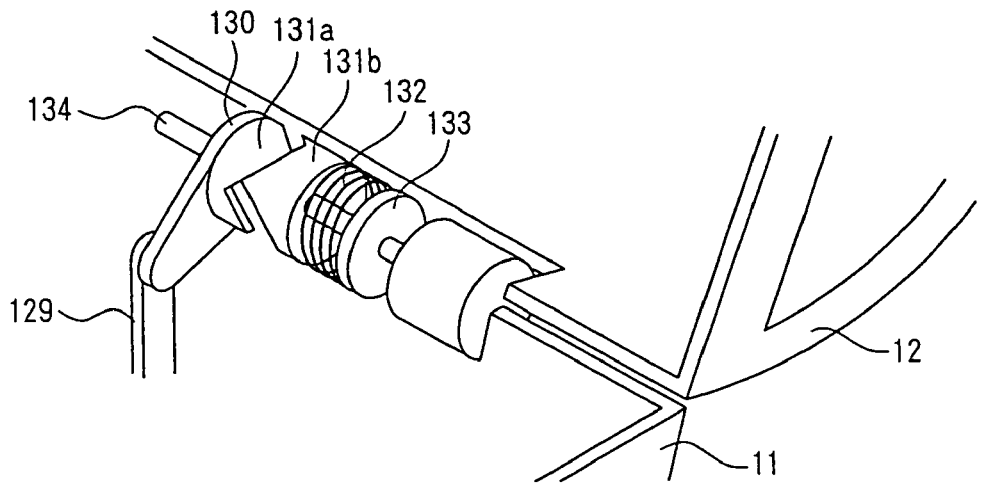
FIGS. 11A, 11B, and 11C are views for explaining functions of clutch portions 131*a* and 131*b*, and a spring 132 according to the first embodiment.

Here, referring to FIGS. 11A to 11C, the functions of the clutch portions 131a and 131b, and the spring 132 will be described.

Figure 11B:
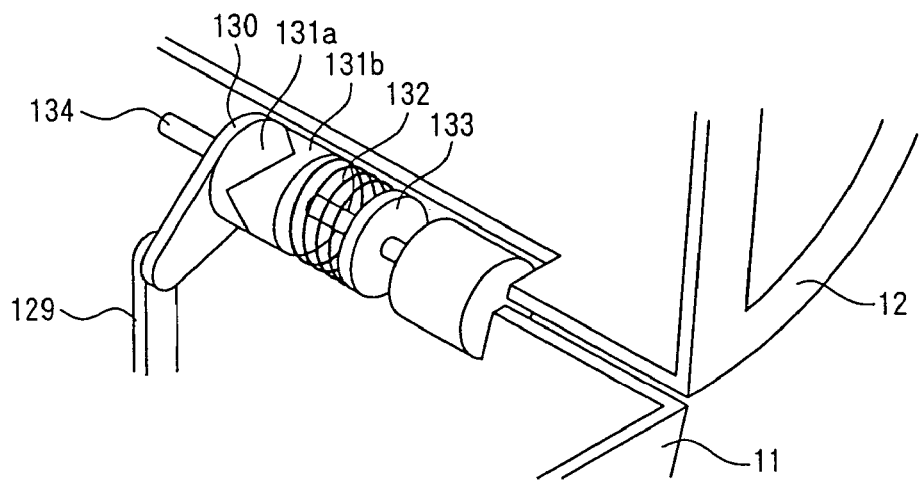
Figure 11C:
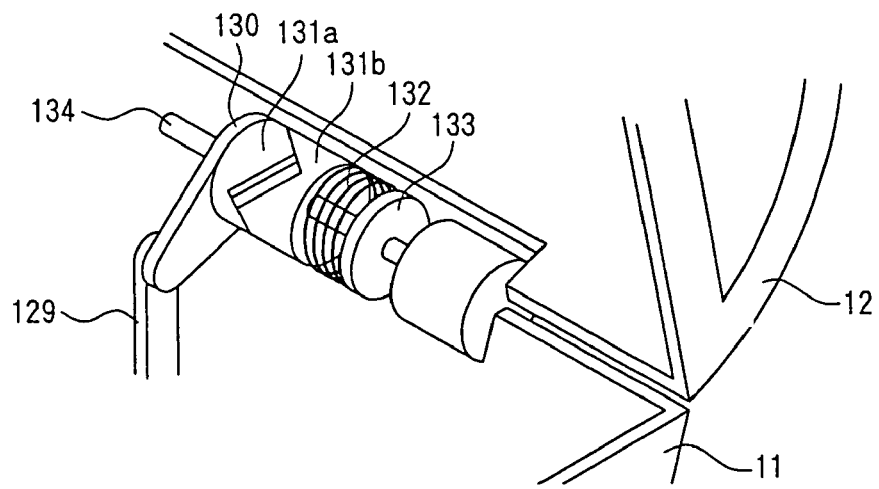

In a state in which the lid 12 is driven by the motor unit M, as shown in FIG. 11B, the engaging portion 131a1 of the clutch portion 131a and the engaging portion 131b1 of the clutch portion 131b are tightly engaged without leaving a space. In this state, the torque of the rotating portion 130 and the clutch portion 131a is transferred to the clutch portion 131b and the rotating shaft 134. Further, the spring 132 energizes the clutch portion 131b so that the clutch portion 131a and the clutch portion 131b engage without leaving a space.

Now, when the lid 12 is in an opened state, in case the lid 12 is applied manually with a force in a direction to separate from the main body 11 (hereinafter referred to as <opening direction>), the rotating shaft 134 of the lid 12 is rotated, and its torque is transferred to the clutch portion 131b, but is not transferred to the clutch portion 131a. That is, as shown in FIG. 11C, the engaging state between the engaging portion 131a1 of the clutch portion 131a and the engaging portion 131b1 of the clutch portion 131b is released, and accompanied with this, the spring 132 is put into a shrunk state, and therefore, the torque is not transferred manually to the clutch portion 131a. In this state, if the hand is released from the lid 12, the lid is returned to the state of FIG. 11B due to restoring force of the spring 132. It should be noted that, depending on the strength of the spring 132, the lid 12 is sometimes not returned to the state of FIG. 11B.

Meantime, in case a force is applied manually to the lid 12 in the opening direction, the lid 12 is put into a state of FIG. 11A. Even at this time, similarly, the engaging state between the engaging portion 131a1 of the clutch portion 131a and the engaging portion 131b1 of the clutch portion 131b is released, and if the hand is released from the lid 12, the lid is returned to the state of FIG. 11B due to restoring force of the spring 132.

Since the opening and closing mechanism operates as described above, when the lid 12 is in an opened state, even if a force is applied suddenly to the lid 12 in a closing direction or the opening direction, the engaging state between the engaging portion 131a1 of the clutch portion 131a and the engaging portion 131b1 of the clutch portion 131b is released, and the clutch portion 131b slides in the direction of the spring 132, and accompanied with this, the spring 132 is shrunk, and therefore, a great shock is not applied to the clutch portion 131a, the clutch portion 131b, and the rotating portion 130. Hence, the breakage of the clutch portion 131a, the clutch portion 131b, and the rotating portion 130 can be prevented.

In brief, the opening and closing mechanism is constituted by including gears 122, 123a, 123b and 124a which transfer the torque of the motor unit M while reducing the rotational speed of the motor unit M; the slide shaft 127 which converts the torque of the gear 124a into a reciprocal motive power and transfers it; the angle change shaft 128 for changing the angle of the reciprocal motive power transferred by this slide shaft 127; a link mechanism (arm 129 and rotating shaft 130) having one end connected to this angle change shaft 128 and changing the reciprocal motive power changed in angle by this angle change shaft 128 into the rotational motion; and the clutch portions 131a and 131b connected to the other end of this link mechanism and transferring the rotational motion power changed by this link mechanism to the rotating shaft 134 of the lid 12.

It should be noted that the hinge portion 114 is provided with a sensor (not shown) for stopping the supply of the power from the power source portion 106 to the motor unit M and the LED 120 in case the lid 12 is rotated to some extent in the opening direction. Further, similarly, the opening portion 111 is provided with a sensor (not shown) for stopping the supply of the power from the power source portion 106 to the motor unit M when the lid 12 is put into a closed state.

<Functional Constitution>

The function of the electronic storage box 1 shown in FIG. 1 is realized by the function of each part constituting the electronic storage box 1, the function realized by executing the program stored in the memory by the CPU on the substrate 118, and the data stored in the memory.

A key storage portion 103 shown in the figure is constituted by including a memory on the substrate 118. The key storage portion 103 stores cryptograph information. The key storage portion 103 is stored with default cryptograph information at the time of shipment. Further, after the time of shipment, the key storage portion 103 is stored with the cryptograph information set independently by the user who purchased the electronic storage box 1.

A control portion 101 is constituted by including the CPU and the memory of the substrate 118. The control portion 101 controls the whole electronic storage box 1.

The control portion 101 comprises a determining function 1011. When the opening and closing request signal requesting for the opening and closing of the lid 12 of the electronic storage box 1 is received from the PC 21, the determining function 1011 determines whether or not the cryptograph information stored in the key storage portion 103 and the cryptograph information included in the opening and closing request signal match with each other. In case these pieces of the cryptograph information match with each other, the determining function 1011 issues an instruction to a door opening and closing controller 102 for the lid 12 to shift either to an opened state or a closed state according to the current opening and closing state of the lid 12. Incidentally, the control portion 101 determines the current opening and closing state of the lid 12 from the content of the opening and closing status management information stored in the memory.

Further, in case a cryptograph setting request signal for requesting a setting of the cryptograph is received from the PC 21, the control portion 101 stores the cryptograph information included in the cryptograph setting request signal in the key storage portion 103.

The door opening and closing controller 102 is constituted by including the opening and closing mechanism and the lock mechanism. The door opening and closing controller 102 controls the opening and closing of the lid 12 by receiving instructions from the control portion 101.

Specifically, the door opening and closing controller 102, upon receipt of the instruction to the effect that the lid 12 be shifted to an opened state from the control portion 101, performs a processing of shifting the lid 12 to an opened state. That is, the door opening and closing controller 102 supplies the power to the motor unit M from the power source portion 106, thereby rotating the lid 12 in the opening direction by the opening and closing mechanism after a control by the lock mechanism is released.

Meantime, the door opening and closing controller 102, upon receipt of the instruction to the effect that the lid 12 be shifted to a closed state from the control portion 101, performs a processing of shifting the lid 12 to a closed state. That is, the door opening and closing controller 102 supplies the power to the motor unit M from the power source portion 106, thereby rotating the lid 12 in the direction to cover the opening 111 of the main body 11 by the opening and closing mechanism. The door opening and closing controller 102, after driving the lid 12 till the state in which the opening portion 111 of the main body 11 is completely covered, performs a control by the lock mechanism.

An interface portion 104 performs a control of receiving an electrical signal from the PC 21 through the USB cable and the USB connecting terminal 113.

A dramatic presentation controller 105 is a controller for representing realistic sensations when the lid 12 of the electronic storage box 1 is shifted to an opened state. The presentation controller 105 is constituted by including a sound 1051 and a luminous device 1052.

The sound 1051 is constituted by including a sound IC, and outputs a sound such as music, an effective sound, and the like. The luminous device 1052 is constituted by including a LED, and is a device for outputting a light. When the lid 12 of the electronic storage box 1 is shifted to an opened state, the power is supplied to the representation controller 105 from the power supply 106, so that the sound is outputted from the sound 1051 and the light is emitted from the luminous device 1052.

The power source portion 106 supplies a power supplied from the PC 21 to the motor unit M and the representation controller 105.

<A-1-3. PC>

Next, the constitution of the PC 21 will be described. The PC 21 comprises, a CPU, a storage portion including a ROM, a RAM, and a hard disc device, a communication interface controlling the communication with an external device, and an user interface including a keyboard.

The storage portion of the PC 21 can store a cryptograph setting program P1 for transmitting a cryptograph setting request signal to an electronic storage box 1 and an opening and closing program P2 for transmitting an opening and closing request signal. These programs P1 and P2 can be installed from an auxiliary CD-ROM (Compact Disc Read Only Memory) or can be downloaded from WWW (World Wide Web) server when the user purchases the electronic storage box 1.

The cryptograph setting request signal includes information indicating that the signal is a signal requesting for cryptograph setting, and the cryptograph information inputted from the user interface of the PC 21.

The opening and closing request signal includes information indicating that the signal is a signal requesting for the opening and closing of the lid 12, and the cryptograph information inputted from the user interface.

<A-1-4. Opening and Closing Processing>

Figure 12:
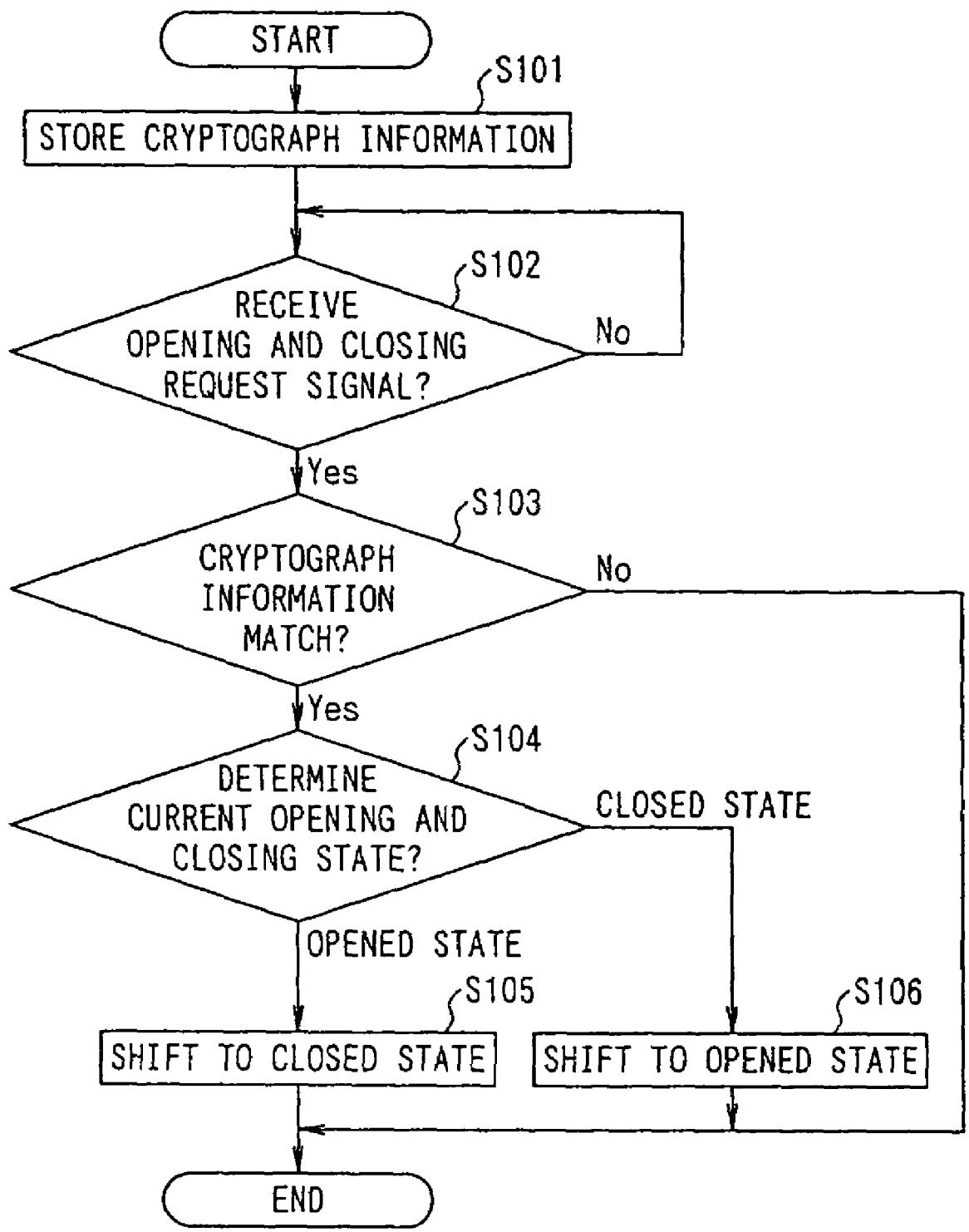
FIG. 12 is a flowchart showing the flow of an opening and closing processing according to the first embodiment.

Next, an operation in which the electronic storage box 1 allows the opening and closing state of the lid 12 to shift will be described with reference to FIG. 12.

First, the user connects the electronic storage box 1 and the PC 21 by the USB cable. Subsequently, the user inputs the cryptograph information such as a password and the like from the user interface of the PC 21, and performs the inputting of the instruction on the cryptograph setting. In this manner, the CPU of the PC 21, by executing the cryptograph setting program P1, generates a cryptograph setting request signal including the cryptograph information. The CPU of the PC 21 transmits the generated cryptograph setting request signal to the electronic storage box 1 through the USB cable.

The interface portion 104 of the electronic storage box 1 receives the cryptograph setting request signal, and delivers it to the control portion 101. The control portion 101 stores the cryptograph information included in the cryptograph setting request signal in the key storage portion 103 (step S101).

Next, the user inputs the cryptograph information from the user interface of the PC 21, and performs the inputting of the instruction for opening and closing the lid 12 of the electronic storage box 1. In this manner, the PC 21 generates an opening and closing request signal including the cryptograph information. Then, the PC 21 transmits the generated opening and closing request signal to the electronic storage box 1 through the USB cable.

The interface portion 104 of the electronic storage box 1 receives the opening and closing request signal (step S102: Yes), and delivers the received opening and closing request signal to the control portion 101.

The control portion 101, upon receipt of the opening and closing request signal, acquires the cryptograph information stored in the key storage portion 103. The determining function 1011 of the control portion 101 compares the cryptograph information included in the opening and closing request signal and the cryptograph information acquired from the key storage portion 103, and determines whether or not these pieces of the cryptograph information match with each other (step S103).

When it is determined that these pieces of the cryptograph information do not match with each other (step S103: No), the control portion 101 transmits a message notifying to the effect that the cryptograph information inputted by the user does not match the cryptograph information stored in the electronic storage box 1 to the PC 21 and displays it in a display. Incidentally, at this time, the message may be notified by a sound signal by the sound 1051 or by flushing on and off the LED by the luminous device 1052.

Meantime, in case it is determined that these pieces of the cryptograph information match with each other (step S103: Yes), the control portion 101 determines whether the lid 12 is currently in an opened state or a closed state. Specifically, the control portion 101 determines whether or not the opening and closing status management information stored in the non-volatile memory indicates an opened state or a closed state.

In case the opening and closing status management information indicates an opened state, the control portion 101 instructs the door opening and closing controller 102 to allow the lid 12 to shift into a closed state.

The door opening and closing controller 102, upon receipt of the instruction from the control portion 101, performs a processing of shifting the lid 12 into a closed state (step S105). Specifically, the door opening and closing controller 102 drives the motor unit M by supplying the power to the motor unit M from the power supply portion 106, and drives the lid 12 in the direction to cover the opening portion 111 by the opening and closing mechanism. After the lid 12 is driven up to the position to completely cover the opening portion 111, the door opening and closing controller 102 allows the lid lock piece 12a and the claw portion 126a of the lid lock 126 to engage with each other, thereby controlling the movement of the lid 12 by the lock mechanism.

Meantime, in case the opening and closing status management information indicates a closed state, the control portion 101 instructs the door opening and closing controller 102 to allow the lid 12 to shift into an opened state.

The door opening and closing controller 102, upon receipt of the instruction from control portion 101, performs a processing of shifting the lid 12 into an opened state (step S106). Specifically, the door opening and closing controller 102 supplies the power to the motor unit M from the power source 106 so as to drive the motor unit M, and releases the engagement between the lid lock pieces 12a and the claw portion 126a of the lid lock 126, thereby releasing a control by the lock mechanism. Subsequently, the door opening and closing controller 102 rotates the lid 12 in the opening direction by the opening and closing mechanism.

<A-2. Operation>

Next, the operation in the above described constitution will be described with reference to FIGS. 1 and 12.

As an operation example, a case will be described, where a giver puts a present inside the electronic storage box 1 with the lid 12 in a closed state, and then, delivers it to a recipient, and after that, the recipient puts the lid 12 of the electronic storage box 1 into an opened state.

Here, the PC owned by the giver is taken as a PC 21a, and the PC owned by the recipient is taken as a PC 21b.

First, the giver purchases the electronic storage box 1. The electronic storage box 1 is attached with a CD-ROM and an instruction manual. The CD-ROM stores a cryptograph setting program P1 and an opening and closing program P2, which are to be installed into the PC 21a of the giver and the PC 21b of the recipient.

Further, the instruction manual describes with the default cryptograph information set in advance in the electronic storage box 1, and the procedure of opening and closing the lid 12 of the electronic storage box 1. Further, the non-volatile memory of the electronic storage box 1 stores default cryptograph information and opening and closing status management information indicating that the lid 12 is currently in a closed state.

Further, in the following operation example, the cryptograph information inputted by the giver and the recipient from the PC 21a and the PC 21b is considered to match the cryptograph information stored in the electronic storage box 1 at a point of time when the inputting is made.

<A-2-1. Processing of Shifting Electronic Storage Box Purchased by Giver into Opened State>

First, the giver installs in the PC 21a the programs P1 and P2 stored in the CD-ROM. Subsequently, the giver connects the electronic storage box 1 and the PC 21a by the USB cable. Then, the giver operates the keyboard of the PC 21a by referring to the procedure printed in the instruction manual, and inputs the default cryptograph information, and performs the inputting of the instruction for shifting the lid 12 of the electronic storage box 1 into an opened state.

In this manner, the PC 21a reads the opening and closing program P2 from the storage portion and executes it, thereby generating an opening and closing request signal including the inputted cryptograph information. Then, the PC 21a transmits the generated opening and closing request signal to the electronic storage box 1 through the USB cable.

The interface portion 104 of the electronic storage box 1, upon receipt of the opening and closing request signal (step S102: Yes), delivers the opening and closing request signal to the control portion 101. The control portion 101 acquires the default cryptograph information stored in the key storage portion 103. The determining function 1011 of the control portion 101 compares the cryptograph information included in the opening and closing request signal and the cryptograph information acquired from the key storage portion 103, and determines whether or not these pieces of the cryptograph information match with each other (step S103).

Here, since these pieces of the cryptograph information are matched with each other (step S103: Yes), the control portion 101 determines whether the lid 12 is currently in an opened state or a closed state (step S104). Here, since the opening and closing status management information stored in the non-volatile memory indicates a closed state, the control portion 101 instructs the door opening and closing controller 102 to allow the lid 12 to be shifted into an opened state.

The door opening and closing controller 102, upon receipt of the instruction from the control portion 101, performs a processing of shifting the lid 12 into an opened state (step S106). Specifically, the door opening and closing controller 102 release a control of the lock mechanism by driving the motor unit M, and after that, drives the lid 12 into the opening direction by the opening and closing mechanism, thereby shifting the lid 12 into an opened state.

When the lid 12 is driven to some extent in the opening direction, the sensor detects it. The sensor stops the supply of the power to the motor unit M, thereby stopping the drive of the motor unit M. The control portion 101 stores the opening and closing status management information indicating an opened state in the non-volatile memory.

A-2-2. Processing of Giver Putting Present into Electronic Storage Box and Shifting it into Closed State>

Next, the giver operates the keyboard of the PC 21a to input the giver's independent cryptograph information, and moreover performs the inputting of the instruction for the cryptograph setting.

In this manner, the CPU of the PC 21a, reads the cryptograph setting program P1 from the storage portion and executes the program P1 to thereby generate a cryptograph setting request signal including the cryptograph information. Then, the CPU of the PC 21a transmits the cryptograph setting request signal to the electronic storage box 1 through the USB cable.

The interface portion 104 of the electronic storage box 1 receives the cryptograph setting request signal, and delivers the cryptograph setting request signal to the control portion 101. The control 101 stores the cryptograph information included in the cryptograph setting request signal in the non-volatile memory 103 (step S101).

Next, the giver stores a present in the storage portion 115 of the main body 11. Then, the giver operates the keyboard of the PC 21a to input the same cryptograph information as inputted in step S101, and moreover, performs the inputting of the instruction for the lid 12 to be shifted into a closed state.

In this manner, the CPU of the PC 21a, executes the opening and closing program P2 to thereby generate an opening and closing request signal including the inputted cryptograph information. Then, the CPU of the PC 21a transmits the generated opening and closing request signal to the electronic storage box 1 through the USB interface.

The interface portion 104 of the electronic storage box 1 receives the opening and closing request signal (step S102: Yes), and delivers the opening and closing request signal to the control portion 101. The control portion 101, upon receipt of the opening and closing request signal, acquires the cryptograph information from the key storage portion 103. The determining function 1011 of the control portion 101 compares the cryptograph information included in the opening and closing request signal and the cryptograph information acquired from the key storage portion 103, and determines whether or not these pieces of the cryptograph information match with each other (step S103).

Here, since these pieces of the cryptograph information match with each other (step S103: Yes), the control portion 101 determines whether the lid 12 is currently in an opened state or a closed state. Here, since the opening and closing status management information stored in the non-volatile memory indicates an opened state, the control portion 101 performs the inputting of the instruction for shifting the lid 12 into a closed state for the door opening and closing control 102.

The door opening and closing controller 102, upon receipt of the instruction, performs a processing of shifting the lid 12 into a closed state (step S105). Specifically, the door opening and closing controller 102 drives the motor unit M, and drives the lid 12 in the direction to cover the opening portion 111 by the opening and closing mechanism. The door opening and closing controller 102 performs a control by the lock mechanism after the lid 12 is driven up to the position where the lid 12 completely covers the opening portion 111.

As described above, the giver puts a present in the electronic storage box 1 which is set with its independent cryptograph information. Then, the giver hands over the electronic storage box 1 to the recipient.

After that, the giver, for example, transmits E-mail to the PC 21b of the recipient from a PC 20a on the birthday of the recipient himself or at Christmas. The E-mail is written with the cryptograph information set in the electronic storage box 1, and is attached with the programs P1 and P2 stored in the CD-ROM. Incidentally, other than the E-mail, the giver may send by mail to the recipient the CD-ROM storing the programs P1 and P2 and a letter paper with the cryptograph information written therein.

<A-2-3. Operation by Recipient>

The PC 21b of the recipient receives the E-mail. The recipient installs the programs P1 and P2 in the PC 21b in the same procedure as the giver. Subsequently, the recipient operates the keyboard of the PC 21b to input the notified cryptograph information, and moreover, performs the inputting of the instruction for opening the lid 12 of the electronic storage box 1.

After that, the operation on the occasions when the lid 12 of the electronic storage box 1 is shifted into an opened state is similar to the operation subsequent to step S102 described in <A-2-1. Processing of Shifting Electronic Storage Box Purchased by Giver into Opened State>, and therefore, the repeated description thereof will be omitted.

It should be noted that, simultaneously with the rotation of the lid 12 of the electronic storage box 1 in the opening direction, the power is supplied to the presentation controller 105 from the power supply portion 106, and the light outputted from the luminous device 1052 flushes on and off, and sounds are outputted from the sound 1051.

Second Embodiment

Next, a second embodiment according to the present invention will be described. In the second embodiment, as an external device for transmitting a signal to an electronic storage box 1, a mobile phone comprising an infrared communication function is used. Further, as a device for compensating for a processing capacity of the mobile phone, a server is used.

<B-1. Constitution>

Figure 13:
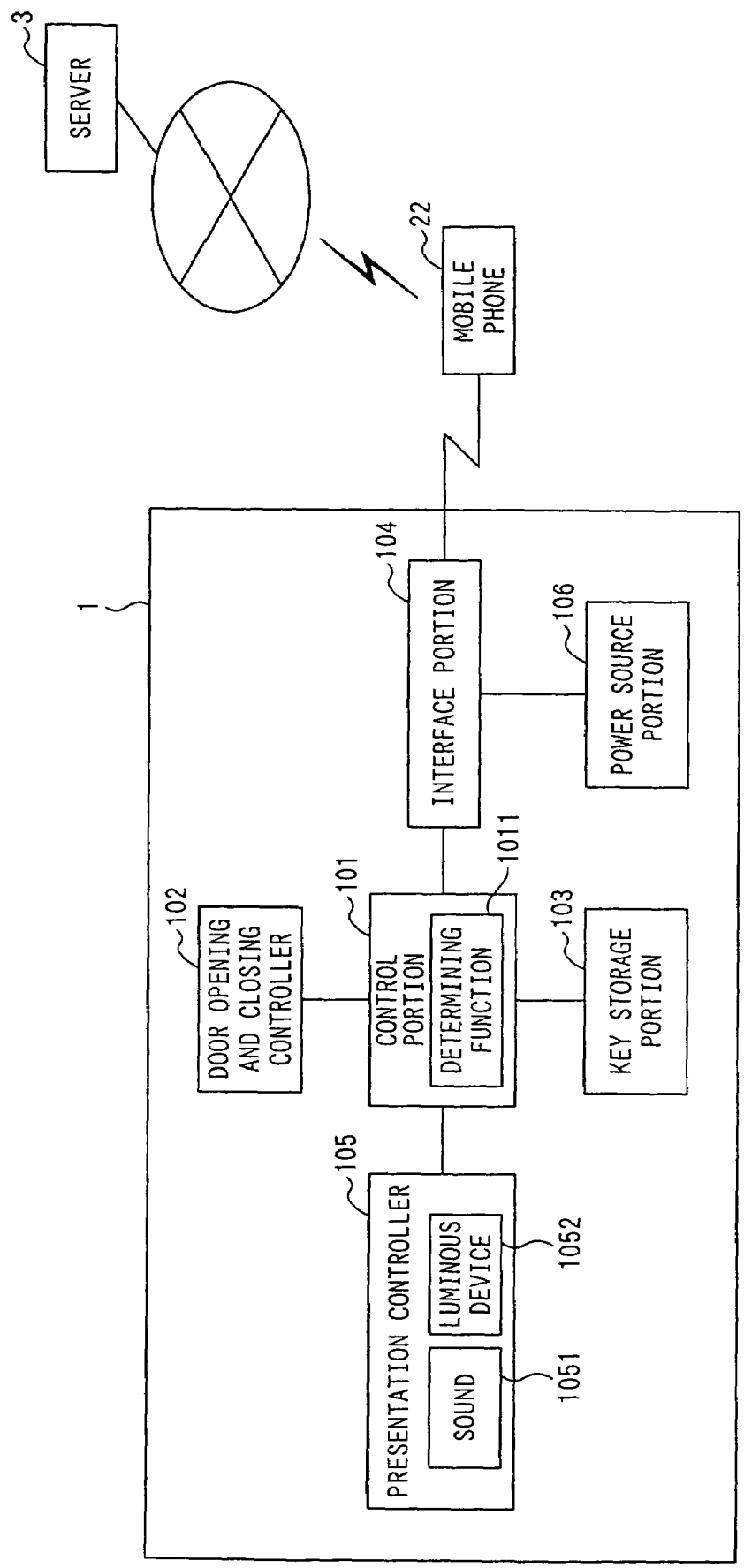
FIG. 13 is a block diagram showing a constitution of a storage box opening and closing system according to a second embodiment of the present invention.

FIG. 13 is a block diagram showing the whole constitution of a storage box opening and closing system according to the second embodiment of the present invention. The storage box opening and closing system shown in the figure is different from the first embodiment in that the PC 21 in the first embodiment is replaced by a mobile phone 22, and that a server 3 connected to the mobile phone 22 through a communication network such as the Internet and the like becomes a constituent element.

Further, the electronic storage box 1 in the second embodiment is different from the electronic storage box 1 in the first embodiment in that an infrared light receiving portion is provided in the front surface of a main body 11, and that a battery mounting portion for fitting a battery is provided. Further, an interface portion 104 of the electronic storage box 1 is constituted by including an interface for controlling the reception of the infrared signal and the infrared light-receiving portion. Further, a power supply portion 106 is a battery fitted to the battery-mounting portion.

The server 3 is an ordinary WWW server. The storage portion of the server 3 is stored with a program for generating a program to be downloaded into the mobile phone 22.

The CPU of the server 3, upon receipt of a request for cryptograph setting from the mobile phone 22, executes the above described program so as to generate a cryptograph setting request signal including the cryptograph information inputted from the mobile phone 22, and generates a cryptograph setting program P3 for transmitting the cryptograph setting request signal as the infrared signal. The CPU of the server 3 transmits the generated cryptograph setting program P3 to the mobile phone 22.

Further, the CPU of the server 3, upon receipt of the opening and closing request of a lid 12 from the mobile phone 22, executes the above described program so as to generate an opening and closing request signal including the cryptograph information inputted from the mobile phone 22, and generates an opening and closing program P4 for transmitting the cryptograph setting request signal as an infrared signal. The CPU of the server 3 transmits the generated opening and closing program P4 to the mobile phone 22.

It should be noted that the programs P3 and P4 are, for example, described in Java® language.

The mobile phone 22 is an ordinary mobile phone, and comprises a CPU for controlling the whole mobile phone 22, a wireless communication portion for controlling wireless communications, an operation portion for giving instructions to the CPU by operation of various types of manual operation buttons, a storage portion including a volatile memory and a non-volatile memory, and an infrared communication portion for performing infrared communications according to an IrDA (Infrared Data Association).

From the initial shipment onward, the storage portion of the mobile phone 22 stores software for performing Internet connections and infrared communications and software for executing a program described in Java® language.

<B-2. Operation>

Next, the operation in the above described structure will be described with reference to FIGS. 12 and 13.

The giver purchases the electronic storage box 1 attached with an instruction manual. Here, different from the first embodiment, the electronic storage box 1 is not attached with a CD-ROM because a program is downloaded from the server.

First, the giver operates the mobile phone 22 according to the instruction manual, and connects it to the server 3. Next, the giver, according to the same procedure as the first embodiment, operates the mobile phone 22 and inputs default cryptograph information described in the instruction manual, and performs inputting of the instruction for shifting the lid 12 of the electronic storage box 1 into an opened state.

In this manner, the mobile phone 22 transmits the opening and closing request and the cryptograph information to the server 3. The server 3 generates an opening and closing program P4 for transmitting the cryptograph setting request signal including the received cryptograph information, and transmits it to the mobile phone 22.

The mobile phone 22, by executing the opening and closing program P4 received from the server 3, transmits the opening and closing request signal from the infrared communication portion.

An infrared light receiving portion of the electronic storage box 1 receives the opening and closing request signal and transfers it to a control portion 101 via an interface portion 104.

Since the subsequent operations on the occasion when the lid 12 of the electronic storage box 1 is shifted into an opened state are the same as <A-2-1. Processing of Shifting Electronic Storage Box Purchased by Giver into Opened State> in the first embodiment, the repeated description thereof will be omitted.

Next, the giver puts a gift into a storage portion 115 of the electronic storage box 1 shifted into an opened state. Subsequently, the giver operates the mobile phone 22 to input independent cryptograph information, and performs inputting of the instruction for cryptograph setting.

In this manner, the mobile phone 22 transmits the cryptograph information and the cryptograph setting request to the server 3.

The server 3, upon receipt of the cryptograph setting request from the mobile phone 22, generates a cryptograph setting program P3 for transmitting the cryptograph setting request signal including the cryptograph information inputted by the giver as the infrared signal. The server 3 transmits the generated cryptograph setting program P3 to the mobile phone 22. Further, the server 3, at this time, generates an opening and closing program P4 for transmitting the opening and closing request signal including the same cryptograph information.

The mobile phone 22 receives the cryptograph setting program P3 from the server 3. The mobile phone 22, by executing the cryptograph setting program P3, transmits the cryptograph setting request signal from the infrared communication portion.

The interface portion 104 of the electronic storage box 1, upon receipt of the cryptograph setting request signal, transmits the request signal to the control portion 101. The control portion 101 stores the cryptograph information included in the cryptograph setting request signal in a key storage portion 103 (step S101).

The giver operates the mobile phone 22 to have access to the server 3, and inputs the same cryptograph information as the set cryptograph information, and performs inputting of the instruction for shifting the lid 12 into a closed state. In this manner, the mobile phone 22 transmits the opening and closing request signal and the cryptograph information to the server 3, and downloads the opening and closing program P4 prepared at the cryptograph setting time from the server 3.

The mobile phone 22, by executing the opening and closing program P4, transmits the opening and closing request signal to the electronic storage box 1 from the infrared communication portion.

The electronic storage box 1 shifts the lid 12 of the electronic storage box 1 into a closed state according to the same procedure as <A-2-2. Processing of Giver Putting Present into Electronic Storage Box and Shifting it into Closed State>

According to the same procedure as the giver, the recipient also performs the operation of shifting the lid 12 of the electronic storage box 1 into an opened state by downloading the opening and closing program P4 into the mobile phone of the recipient from the server 3.

Third Embodiment

Figure 14:
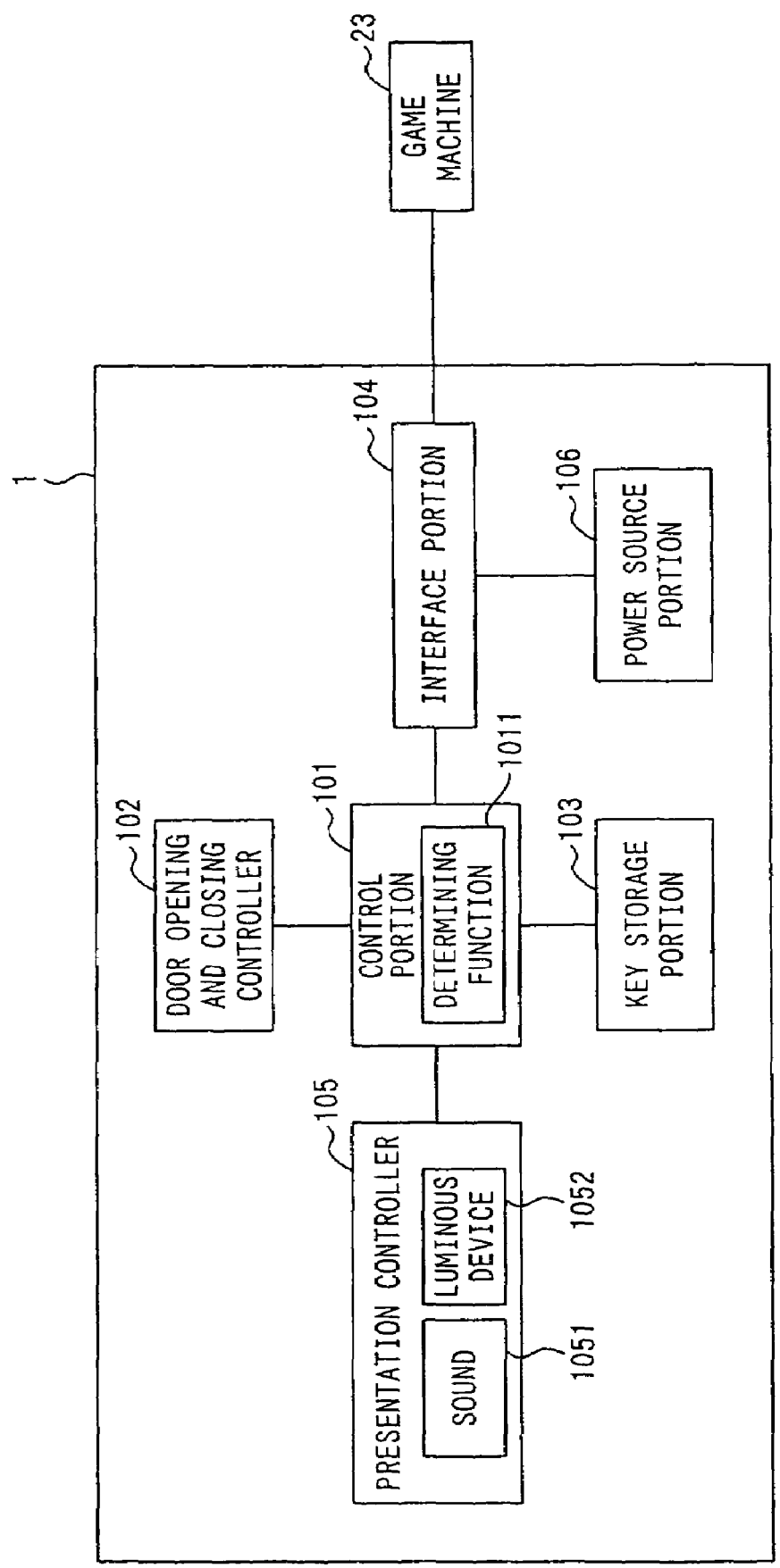
FIG. 14 is a block diagram showing a constitution of a storage box opening and closing system according to a third embodiment of the present invention.

Next, a third embodiment will be described.
<C-1. Constitution>
FIG. 14 is a block diagram showing the whole constitution of a storage box opening and closing system according to a third embodiment of the present invention. The storage box opening and closing system shown in the figure is different from the first embodiment in that the PC 21 in the first embodiment is replaced by a game machine 23.

The game machine 23 comprises a compact computer constitution. That is, the game machine 23 comprises a CPU, a storage portion including a non-volatile memory and a volatile memory, a communication interface for performing communications with an external device, and operation portion for giving instructions by a keyboard to the CPU.

The storage portion of the game machine 23 stores various types of programs and data. For example, in addition to a game program for executing the game, the storage portion of the game machine 23 stores a cryptograph setting program P5 for generating cryptograph information from information on the user who uses the game (hereinafter referred to as <player>) inputted at the game starting time and transmitting a cryptograph setting request signal including the cryptograph information, and a program P6 for transmitting the opening and closing request signal including the cryptograph information in case the proceeding status of the game becomes a predetermined status specified in advance as a program characteristic to the present invention. Further, the storage portion of the game machine 23 stores information indicating the predetermined status specified in advance and cryptograph information generated from the information on the user.

Figure 15:
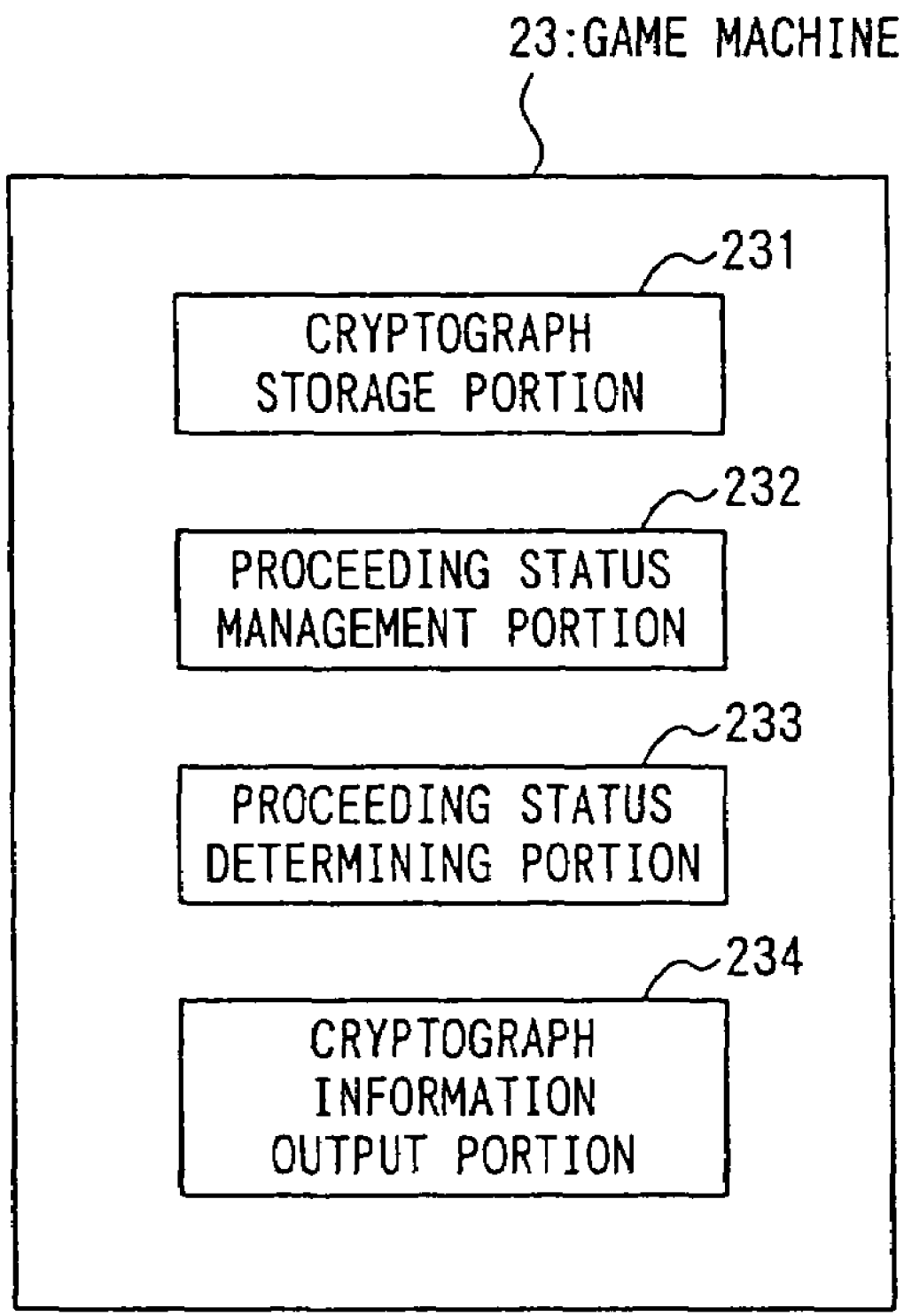
FIG. 15 is a block diagram showing a functional constitution of a game machine 23 according to the third embodiment.

The game machine 23 executes these programs, thereby realizing the functions shown in FIG. 15 in the game machine 23.

As shown in the figure, the game machine 23 comprises a cryptograph storage portion 231, a proceeding status management portion 232, a proceeding status determining portion 233, and a cryptograph information output portion 234.

The cryptograph storage portion 231 is constituted by including the storage portion, and stores the cryptograph information for shifting a lid 12 provided in an electronic storage box 1 into an opened state.

The proceeding status management portion 232 acquires proceeding status information outputted successively through the execution of the program by the CPU of the game machine 23, and manages the proceeding status of the game by temporarily storing the proceeding status information successively in the non-volatile memory.

The proceeding status determining portion 233 determines whether or not the proceeding status information managed by the proceeding status management portion 232 indicates the predetermined status specified in advance.

The cryptograph information output portion 234, in case proceeding status determining portion 233 determines that the proceeding status information indicates the predetermined status specified in advance, generates an opening and closing request signal including the cryptograph information stored in the cryptograph storage portion 231 so as to shift the lid 12 of the electronic storage box 1 into an opened state, and transmits the generated opening and closing request signal to the electronic storage box 1 through a USB cable.

<C-2. Operation>
Next, the operation in the above described constitution will be described with reference to FIGS. 14 and 12.

A game soft maker sells a CD-ROM stored with a game program, programs P5 and P6 and the like and the electronic storage box 1 storing a premium in the storage portion 115 as a set. Further, a game machine maker sells a game machine 23.

The player purchases the CD-ROM, the electronic storage box 1, and the game machine 23, and performs the operation of installing in the game machine 23 the programs stored in the CD-ROM. In this manner, the storage portion of the game machine 23 is stored with a game program for executing the game, the programs P5 and P6, and information indicating the predetermined state specified in advance <100 points or more in the score at a point of time when the game is over>.

Next, the player connects the game machine 23 and the electronic storage box 1. Then, the player operates the operation portion of the game machine 23, and performs inputting of the instruction for starting the game.

In this manner, the CPU of the game machine 23, by executing the cryptograph setting program P5, displays a screen for allowing the player to input the name and birthday data of the player in a display.

The player operates the operation portion of the game machine 23 to input the name and birthday data.

In this manner, the game machine 23 generates cryptograph information based on the inputted information, and stores the cryptograph information in the cryptograph storage portion 231. Further, the game machine 23 generates a cryptograph setting request signal including the generated cryptograph information, and transmits the cryptograph setting request signal to the electronic storage box 1 through a USB cable.

An interface portion 104 of the electronic storage box 1 receives the cryptograph setting request signal, and a control portion 101 stores the cryptograph information included in the cryptograph setting request signal in a key storage portion 103 (step S101).

The CPU of the game machine 23 executes the game program. The player operates the operation portion of the game machine 23 to give instructions to the CPU so as to carry on the game.

The CPU of the game machine 23, by executing the game program, outputs proceeding status information indicating a score of the game according to the input from the operation portion and whether or not the game is over.

During the game program is executed, the proceeding status management portion 232 stores the outputted proceeding status information in the storage portion successively and controls it. Further, the proceeding status determining portion 233 determines successively whether or not the proceeding status information controlled by the proceeding status management portion 232 indicates that the game is over, and that the score has reached 100 points.

In case it is determined that the proceeding status information indicates that the game is over and that the score has reached 100 points, the proceeding status determining portion 233 generates an opening and closing request signal including the cryptograph information stored in the cryptograph storage portion 231, and outputs it to the electronic storage box 1 through the USB cable.

The electronic storage box 1, upon receipt of the opening and closing request signal, allows the lid 12 to be shifted into an opened state according to the same procedure as described in the first embodiment.

Incidentally, during the lid 12 of the electronic storage box 1 is shifted into an opened state, a presentation controller 105 performs suitable presentation processing.

As described above, only when the cryptograph information inputted from the outside and the cryptograph information stored in the key storage portion 103 match with each other, the lid 12 of the electronic storage box 1 is electrically shifted into an opened state, and this can enhance safety and convenience. Further, the driving of the lid 12 at a low speed and enhancement of dramatic presentation effects through the presentation controller 105 can entertain the person receiving a thing stored inside the electronic storage box 1.

3. Modified Embodiment

While the embodiments of the present invention have been described as above, the present invention is not intended to be limited to these embodiments, and can be variously modified within the spirit of the invention. As modified examples, for example, the following can be considered.

In the embodiments described so far, though a description has been made that the lock mechanism is constituted by the lid lock piece 12a, the lid lock 126, and the like, it is not limited to this, and for example, the lock mechanism may be constituted by an electromagnetic solenoid.

In the embodiments described so far, though a description has been made that the cryptograph setting request signal and the opening and closing request signal are transmitted from the PC 21, the mobile phone 22, and the game machine 23, for example, these signals may be transmitted from the remote controller of a television receiver and a radio cassette player. In this case, these signals may be represented by combination of signals transmitted when pushing the operation button of the remote controller.

In the first embodiment described so far, though a description has been made that, at the time of shipment of the electronic storage box 1, the default cryptograph information is set in advance in the key storage portion 103, and in case the electronic storage box 1 receives the opening and closing request signal including the default cryptograph information, the lid 12 is shifted into an opened state, it is not limited to this, and for example, a mechanism may be set up in which only when the USB cable is initially connected to the USB connecting terminal 113 of the electronic storage box 1, the lid 12 is shifted into an opened state.

In the first embodiment described so far, while the PC 21a of the giver has been installed with the programs P1 and P2 from the CD-ROM, and the PC 21b of the recipient has been installed with the programs P1 and P2 from the E-mail, the method of installing the programs P1 and P2 into the PC 21a and the PC 21b is not limited to this, and for example, the PC 21a and the PC 21b may download the programs P1 and P2 from a Web site. Alternatively at the time of shipment, the programs P1 and P2 are kept stored in the electric storage box 1, and when the electronic storage box 1 and the PC 21a and the PC 21b are connected by the USB cable, the programs P1 and P2 may be transmitted and installed to the PC 21a and the PC 21b from the electronic storage box 1.

In the embodiments described so far, though a description has been made that, on occasions when the door opening and closing controller 102 determines whether or not the lid 12 is currently in an opened state or a closed state, it is determined by the opening and closing status management information stored in the non-volatile memory of the electronic storage box 1, the method of determining the opening and closing state is not limit to this. For example, it may be determined by acquiring information in real time from the sensor.

The cryptograph information may be a password constituted by alphabetical characters or may be key information performing certification by a public key encryption system and a common key encryption system.

The shape of the USB cable may be elaborated. For example, the USB cable may be in the shape of a key.

After the recipient shifts the lid 12 of the electronic storage box 1 into an opened state, an opening and closing of the lid 12 may be performed by inserting a physical key into a key hole 112 or the recipient may set new cryptograph information in the electronic storage box 1 so as to electrically open and close the lid 12.

In the embodiments described so far, though the opening and closing mechanism of the lid 12 has been constituted by including the rotating portion 130, the clutch portions 131a and 131b, the spring 132, and the motor unit M, this is just one of the examples, and for example, the mechanism may be constituted by directly connecting the motor unit M to the rotating shaft 134. Further, the spring 132 may be an elastic body, and an elastic matter formed, for example, by resin other than a coiled spring may be used.

In the second embodiment, though a description has been made that the mobile phone 22 transmits a signal to the electronic storage box 1 by the infrared communication, it is not limited to this, and a signal may be transmitted by Bluetooth® communication.

Figure 16C:
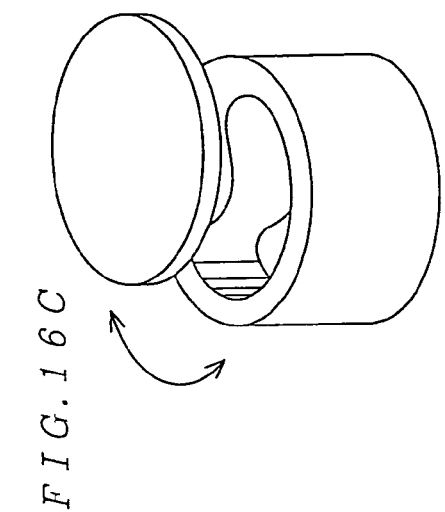
FIGS. 16A to 16F are views for explaining variations of the structure and the opening and closing method of the lid according to a modified embodiment.
Figure 16F:
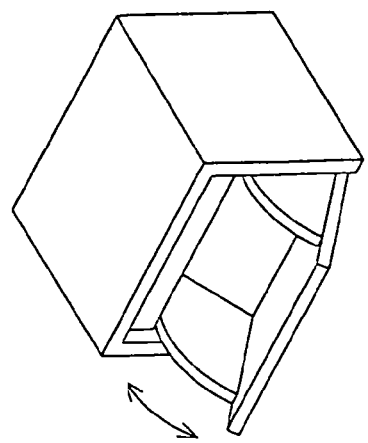
Figure 16B:
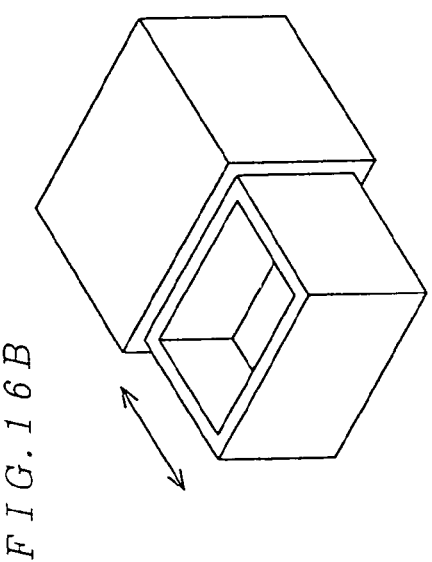
Figure 16E:
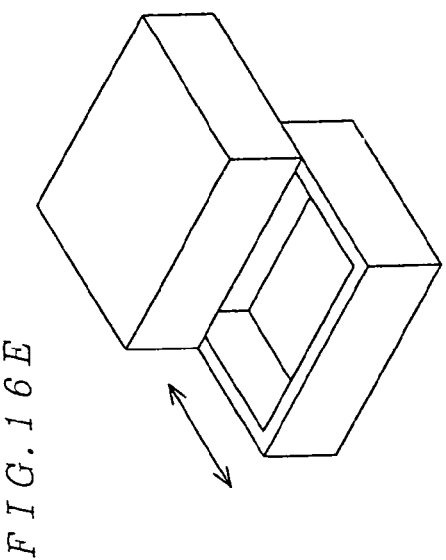
Figure 16A:
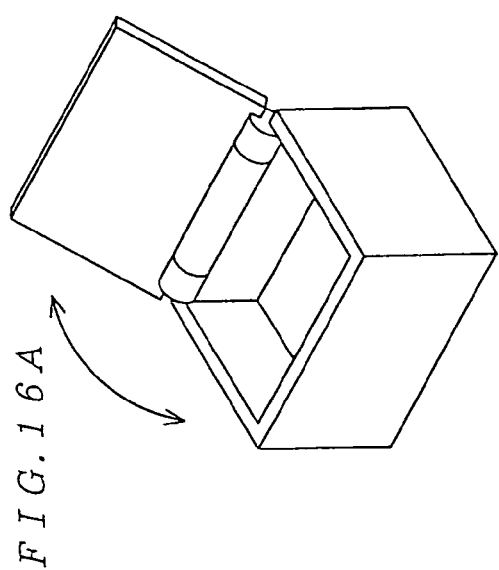
Figure 16D:
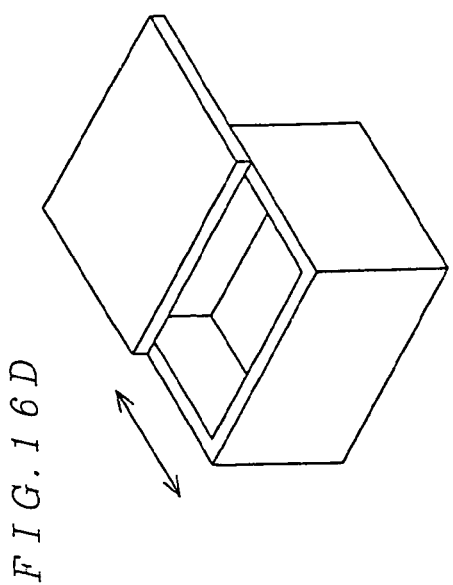

The method of opening and closing the lid 12 of the electronic storage box 1 and the constitution thereof in the embodiments described so far is one of the examples, and for example, the lid 12 may be constituted as shown in FIGS. 16A to 16F. That is, any of the constitutions may be adapted such as a constitution to open and close a flat plate-shaped lid as shown in FIG. 16A, a constitution to open and close a drawer type storage portion as shown in FIG. 16B, a constitution to open and close a disk-shaped lid by rotational sliding as shown in FIG. 16C, a constitution to open and close a flat-plate shaped lid by horizontal sliding as shown in FIG. 16D, a constitution to open and close a thick lid by horizontal sliding as shown in FIG. 16E, and a constitution to open and close by rotating a storage portion journaled at the front bottom of the main body as shown in FIG. 16F.

The electronic storage box can be used in the field of the storage box where portability, safety, convenience, simplicity, and presentation effects are required.

What is claimed is:

1. An electronic storage box, including a main body having a storage portion inside and an opening portion; and a lid controlled in shifting to one of a closed state, in which said opening portion is covered and a movement of said lid is controlled by a lock mechanism, and an opened state, in which said opening portion is not covered and the movement of said lid is released from the control of said lock mechanism, said electronic storage box, comprising:

cryptograph storage means for storing cryptograph information included in a cryptograph setting request signal in response to a cryptograph setting request signal received from an external device;

determining means for determining whether the cryptograph information included in an opening and closing request signal and the cryptograph information stored in said cryptograph storage means match with each other in response to the opening and closing request signal received from the external device; and opening and closing means for shifting the lid either to the opened state or the closed state according to a current opening and closing state of said lid in response to when said determining means determines that these pieces of said cryptograph information match with each other, wherein said opening and closing means includes:

a gear for transferring the torque of a motor, while reducing the rotational speed of the motor;

a slide shaft for converting the torque of said gear into a reciprocal motive power and transmitting it;

an angle change shaft for changing the angle of the reciprocal motive power transferred by said slide shaft;

a link mechanism having one end connected to said angle change shaft and changing the reciprocal motive power changed in angle by the angle change shaft into a rotational movement; and a clutch connected to the other end of said link mechanism and transferring a rotational motion power changed by the link mechanism to the rotating shaft of said lid.

2. The electronic storage box according to claim 1, wherein said opening and closing means releases a control by said lock mechanism if said lid is in the closed state, and shifts said lid into the opened state by driving said lid after being released, and drives said lid in a direction to cover said opening portion if said lid is in the opened state, and shifts said lid into the closed state by engaging said lock mechanism after being driven.

3. The electronic storage box according to claim 1, wherein said external device is any one of a personal computer, a mobile communication terminal, and game equipment.

4. The electronic storage box according to claim 1, wherein the electronic storage box is operated by power supplied through a cable connected with said external device.

5. The electronic storage box according to claim 1, wherein said clutch includes a first clutch portion connected to the other end of said link mechanism and a second clutch portion rotating in association with said rotating shaft, and said first clutch portion and said second clutch portion are provided with an engaging portion comprising a plurality of V-shaped teeth mutually engaged, wherein said opening and closing means further includes an elastic body that is coupled to said second clutch portion for energizing the engaging portions provided in said first clutch portion and said second clutch portion so as to be put into a mutually engaged state, and in case a motive power is applied to said second clutch portion from said lid through said rotating shaft, said V-shaped inclination is adjusted so that the engaged state of the engaging portions is released.

* * * * *